US009749939B2

United States Patent
Sakai

(10) Patent No.: US 9,749,939 B2
(45) Date of Patent: Aug. 29, 2017

(54) APPARATUS FOR CAUSING PROCESSORS TO EXECUTE A PROCESS IN A PARALLEL MANNER

(71) Applicant: FUJITSU LIMITED, Kawasaki-shi, Kanagawa (JP)

(72) Inventor: Daisuke Sakai, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 14/852,166

(22) Filed: Sep. 11, 2015

(65) Prior Publication Data

US 2016/0095052 A1    Mar. 31, 2016

(30) Foreign Application Priority Data

Sep. 25, 2014    (JP) .................................. 2014-195130

(51) Int. Cl.
*H04L 12/28* (2006.01)
*H04W 48/16* (2009.01)
*H04J 11/00* (2006.01)
*G06F 9/50* (2006.01)

(52) U.S. Cl.
CPC .............. *H04W 48/16* (2013.01); *G06F 9/50* (2013.01); *H04J 11/0083* (2013.01); *H04J 11/0089* (2013.01)

(58) Field of Classification Search
CPC . H04W 48/16; H04W 72/02; H04W 72/0466; H04W 72/0453; H04J 11/0089; H04J 11/0086; H04J 11/0083
USPC ......................................................... 370/254
See application file for complete search history.

(56) References Cited

U.S. PATENT DOCUMENTS

| | | | |
|---|---|---|---|
| 2002/0064211 A1* | 5/2002 | Chen ................. | H04W 56/0085 375/149 |
| 2003/0032441 A1 | 2/2003 | Ofuji et al. | |
| 2003/0157892 A1* | 8/2003 | Reznik ............... | H04B 1/70754 455/65 |
| 2005/0259615 A1* | 11/2005 | Chung ................. | H04B 7/2684 370/329 |
| 2008/0095108 A1* | 4/2008 | Malladi ................. | H04B 1/713 370/329 |

(Continued)

FOREIGN PATENT DOCUMENTS

| | | | |
|---|---|---|---|
| EP | 1215829 A2 | 12/2001 | |
| EP | 1215829 A2 | 6/2002 | |

(Continued)

*Primary Examiner* — Mang Yeung
(74) *Attorney, Agent, or Firm* — Arent Fox LLP

(57) ABSTRACT

An apparatus includes a memory configured to store a first program for executing a cell search process on data transmitted from another wireless device, and a second program for executing a demodulation process and/or a decoding process after the cell search process. The apparatus includes a first processor configured to execute the first program, and a second processor configured to execute the second program. The apparatus loads the first program stored in the memory in the first processor. When the first processor is requested to perform the cell search process by executing the first program, the apparatus loads the first program in the second processor, and executes the cell search process on the data in a parallel manner by causing the first and second processors to execute the first program.

11 Claims, 27 Drawing Sheets

(56) References Cited

U.S. PATENT DOCUMENTS

| | | | | |
|---|---|---|---|---|
| 2010/0279684 A1* | 11/2010 | Salkintzis | ............ | H04W 48/20 455/434 |
| 2011/0177815 A1* | 7/2011 | Jeong | ................... | H04W 48/14 455/436 |
| 2013/0259013 A1* | 10/2013 | Malladi | ................ | H04W 56/00 370/336 |

FOREIGN PATENT DOCUMENTS

| | | |
|---|---|---|
| JP | 11-191896 A | 7/1999 |
| JP | 2002-185441 A | 6/2002 |
| JP | 2003-060551 A | 2/2003 |

\* cited by examiner

WIRELESS COMMUNICATION SYSTEM 10

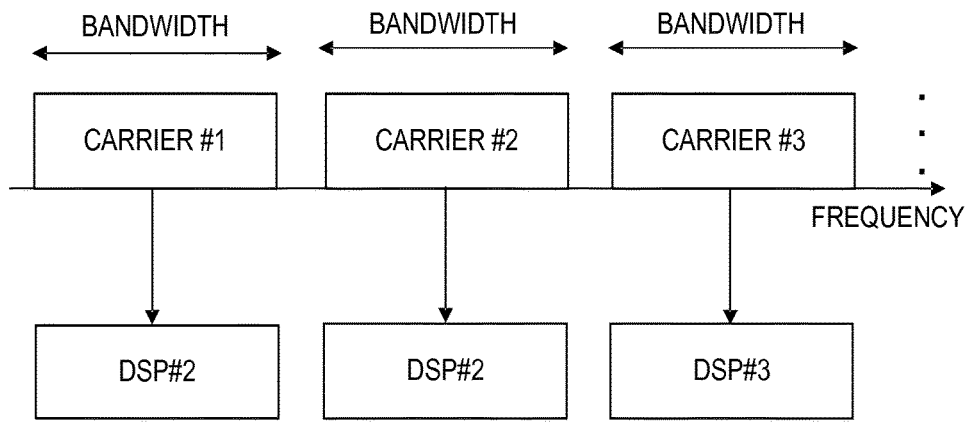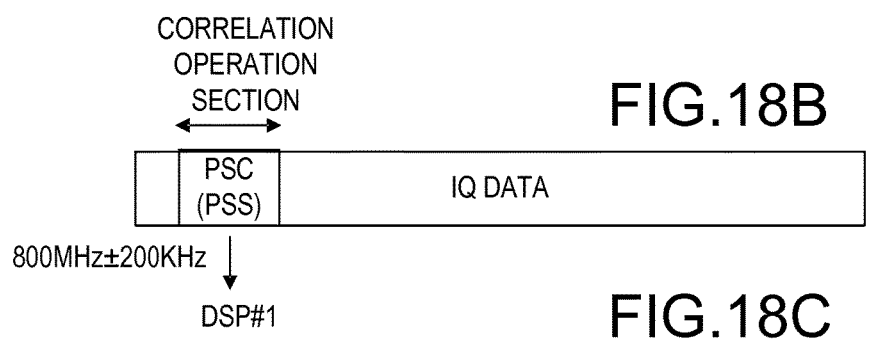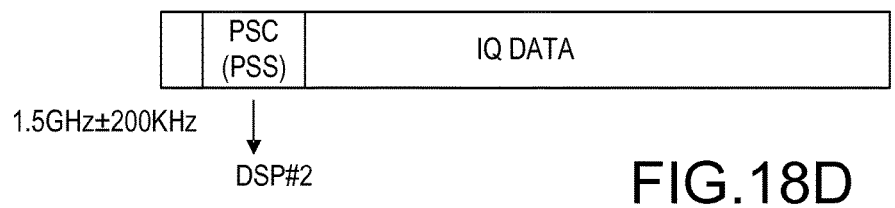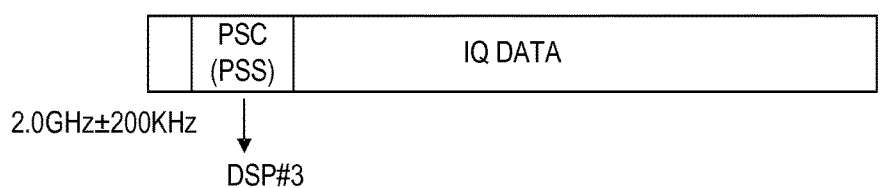

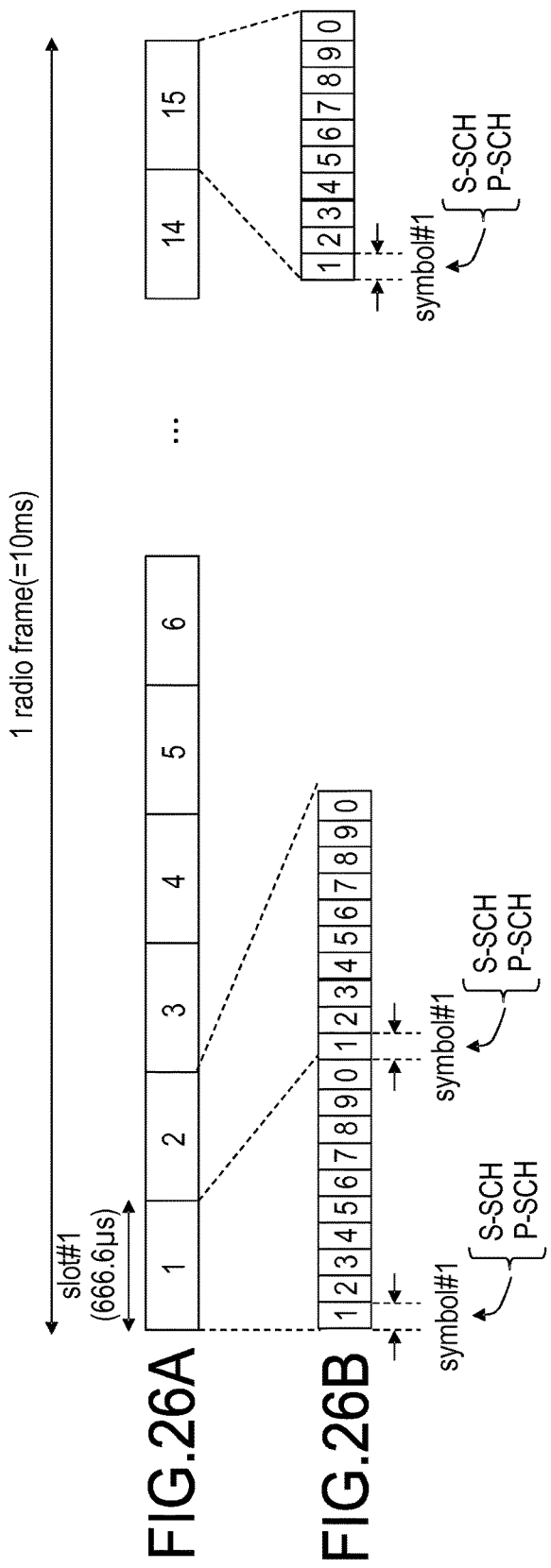

APPARATUS FOR CAUSING PROCESSORS TO EXECUTE A PROCESS IN A PARALLEL MANNER

CROSS-REFERENCE TO RELATED APPLICATIONS

This application is based upon and claims the benefit of priority from the prior Japanese Patent Application No. 2014-195130 filed on Sep. 25, 2014, the entire contents of which are incorporated herein by reference.

FIELD

The embodiments discussed herein are related to an apparatus for causing processors to execute a process in a parallel manner.

BACKGROUND

At present, a wireless communication system, such as a cellular phone system or a wireless local area network (LAN), has been widely used. Also, in the field of the wireless communication, in order to further improve a communication speed or a communication capacity, discussions for the next generation communication are continuously being made. For example, standardization of a communication standard called long term evolution (LTE) or a communication standard based on the LTE, which is called LTE-Advanced (LTE-A), has been completed or is being studied by 3rd Generation Partnership Project (3GPP) which is a standardization organization.

In such a wireless communication system, a communication terminal may perform a cell search process at the time of power-up or stand-by, or during a communication. In the cell search process, processing such as detection of a frame timing or a cell ID (identification) is carried out according to, for example, a synchronizing signal included in a radio signal. The communication terminal may send or receive a radio signal through the cell search in synchronization with a base station, and may also acquire basic information in a case of a wireless communication.

In the cell search processing, for example, there are three types of processing, such as carrier search (hereinafter, may be referred to as a band search) processing, initial cell search processing, and peripheral cell search processing.

The band search process is, for example, processing for specifying a carrier frequency used for a wireless communication by a mobile terminal before the initial cell search process is performed. The initial cell search process is, for example, processing for acquiring a frame timing, a symbol timing, a use frequency, a cell ID (identification) according to the carrier frequency specified in the band search process. For example, the communication terminal may efficiently detect the carrier frequency at the initial cell search process by performing the initial cell search process after the band search process.

The peripheral cell search process is performed when the communication terminal performs a wireless communication with the base station. By the peripheral cell search process, for example, the communication terminal may acquire a maximum of 5 IDs of other cells.

The communication terminal performs a cell search by using a synchronizing signal included in the radio signal. In a 3G system, such as a wideband code division multiple access (W-CDMA), or in an LTE system, two types of synchronizing signals are used.

FIGS. 26A and 26B, and FIGS. 27A and 27B illustrate exemplary configurations of a radio frame in a 3G system and an LTE system, respectively.

As illustrated in FIGS. 26A and 26B, in the 3G system, 15 slots are included within one radio frame. A primary synchronization channel (P-SCH) and a secondary synchronization channel (S-SCH) are included in a head symbol of each slot. The communication terminal detects a first synchronizing signal by using a P-SCH (or may be referred to as a primary synchronization channel (PSC)). Also, the communication terminal detects a second synchronizing signal by using a S-SCH (or may be referred to as a secondary synchronization channel (SSC)). The communication terminal performs a cell search by using the first synchronizing signal and the second synchronizing signal.

As illustrated in FIGS. 27A and 27B, in the LTE system, one radio frame includes 10 sub-frames, each sub-frame includes two slots, and each slot includes seven symbols. The $6^{th}$ and $7^{th}$ symbols of a first slot as a head include an S-SCH and a P-SCH, respectively. Also, the $6^{th}$ and $7^{th}$ symbols of an $11^{th}$ slot from the head include an S-SCH and a P-SCH, respectively. The communication terminal detects a primary synchronization signal (PSS: hereinafter, may be referred to as a first synchronizing signal) by using the P-SCH. The communication terminal also detects a secondary synchronization signal (SSS: hereinafter, may be referred to as a second synchronizing signal) by using the S-SCH. The communication terminal performs a cell search by using the first synchronizing signal and the second synchronizing signal.

In any system, in the initial cell search process, the communication terminal detects, for example, a symbol timing by using a first synchronizing signal in a first step. Then, the communication terminal detects, for example, a frame timing or a cell ID group by using a second synchronizing signal in a second step, and specifies a scrambling code.

As for a technology on such a wireless communication, for example, there are the following technologies.

That is, there is a mobile wireless terminal in which correlation values with all synchronization codes for each slot are detected, deviations thereof are calculated, and frame correlation values corresponding to scrambling code group numbers are detected, so that a frame timing is detected by the corresponding correlation value.

According to this technology, it is possible to provide a mobile terminal device capable of detecting a frame timing with a high precision regardless of changes in a radio propagation environment.

Also, there is a receiving device of a CDMA cellular system in which after a correlation with a reference numeral in response to a baseband signal is made, an output signal is output to a plurality of notice channel demodulating units or a plurality of speech channel demodulating units under the control by a controller, so as to be processed in each of the demodulating units.

According to this technology, it is possible to shorten a time required for the cell search without increasing the size of the circuit.

Furthermore, there is a technology on a mobile station device configured to perform a cell search after performing a carrier search, in which when the carrier search is performed, received power measurement is carried out in an allocated frequency bandwidth, and a range for searching the service carrier is limited to the vicinity of a frequency where the received power exceeds a threshold.

According to this technology, it is possible to provide a mobile station device capable of efficiently performing a carrier search, shortening a time for detecting a service carrier, and reducing power consumption by reducing the number of useless cell searches, thereby prolonging a continuous stand-by time.

Related technologies are disclosed in Japanese Laid-Open Patent Publication No. 2002-185441, Japanese Laid-Open Patent Publication No. 11-191896, Japanese Laid-Open Patent Publication No. 2003-60551

SUMMARY

According to an aspect of the invention, an apparatus includes a memory configured to store a first program for executing a cell search process on data transmitted from another wireless device, and a second program for executing a demodulation process and/or a decoding process after the cell search process. The apparatus includes a first processor configured to execute the first program, and a second processor configured to execute the second program. The apparatus loads the first program stored in the memory in the first processor. When the first processor is requested to perform the cell search process by executing the first program, the apparatus loads the first program in the second processor, and executes the cell search process on the data in a parallel manner by causing the first and second processors to execute the first program.

The object and advantages of the invention will be realized and attained by means of the elements and combinations particularly pointed out in the claims. It is to be understood that both the foregoing general description and the following detailed description are exemplary and explanatory and are not restirctive of the invention, as claimed.

BRIEF DESCRIPTION OF DRAWINGS

FIGS. 18A to 18D are diagrams illustrating an example of an operation, according to an embodiment;
FIGS. 26A and 26B are diagrams illustrating an example of a configuration of a radio frame.

DESCRIPTION OF EMBODIMENTS

In the above described technology for detecting correlation values with all synchronization codes for each slot, thereby calculating deviations thereof, when scrambling code group numbers are specified, a correlation operation is sequentially performed according to a conventionally known signal sequence and a received signal sequence. Also, in a step before the scrambling code group numbers are specified, for example, in a first step, symbol timing may be detected using a first synchronizing signal (PSS or PSC). Accordingly, in the technology, since processes from the first step to specifying of the scrambling code group numbers are sequentially performed, a processing time may become longer than a predetermined time.

Also, in the above described technology for outputting an output signal to a plurality of notice channel demodulating units or a plurality of speech channel demodulating units, a correlation operation process is performed on a baseband signal. In this case, when the correlation operation is performed, a correlation operation is sequentially performed between a signal sequence of the baseband signal and a conventionally known signal sequence. Accordingly, in the technology, a processing time of the correlation operation may become longer than a predetermined time.

Also, in a technology of limiting a search range of a service carrier, when, for example, a carrier search (or a band search) is processed, received power is measured at an allocated frequency band. Accordingly, in the art, when the received power is measured, a band search process is performed on all frequencies of the allocated frequency band. In this case, when the service carrier is specified, a correlation operation is sequentially performed between a received signal sequence and a conventionally known signal sequence. Then, a time for the band search process may become longer than a predetermined time.

Therefore, in the above described three technologies, a time from initiation of the band search process until termination of the initial cell search process may become longer than a predetermined time. In such a case, in the mobile terminal, an initiation time of a demodulation process or a decoding process performed after symbol timing synchronization or frame timing synchronization is later than an originally scheduled initiation time. As a result, after various services such as a call service are requested, a time until the services are provided may become longer than a predetermined time.

Hereinafter, exemplary embodiments of the present disclosure will be described.

[First Exemplary Embodiment]

A first exemplary embodiment will be described.

Figure 1:
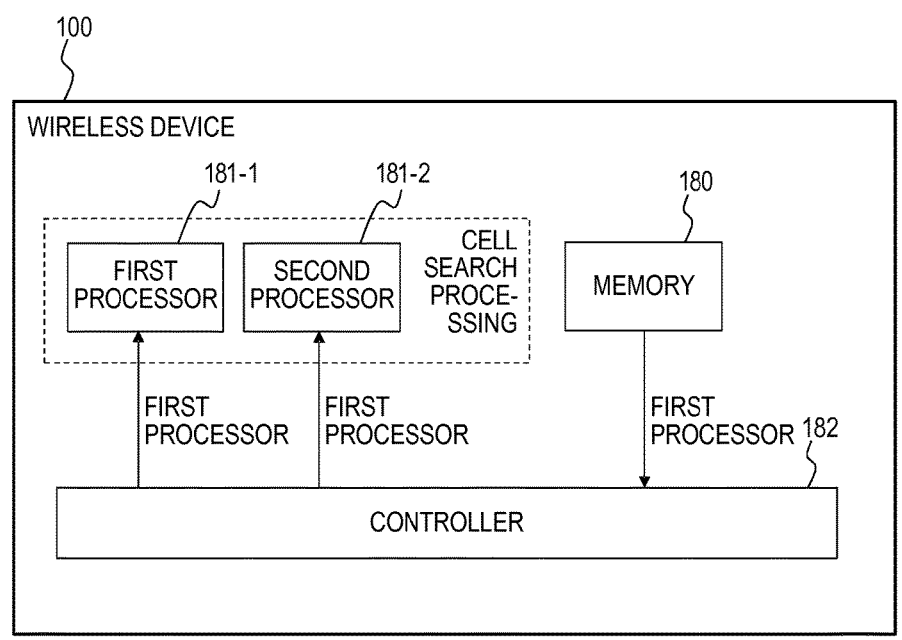
FIG. 1 is a diagram illustrating an example of a configuration of a wireless device, according to an embodiment.

FIG. 1 illustrates an exemplary configuration of a wireless device 100 in a first exemplary embodiment. The wireless device 100 includes a memory 180, a first processor 181-1, a second processor 181-2, and a controller 182.

The memory 180 stores a first program for executing a cell search process on data transmitted from another wireless device, and a second program for executing a demodulation process and a decoding process after the cell search process.

The first processor 181-1 executes the first program.

The second processor 181-2 executes the second program.

The controller 182 loads the first program stored in the memory 180 in the first processor 181-1. The controller 182 also loads the first program in the second processor 181-2 when the first program is executed in the first processor 181-1 to perform a cell search process. Then, the controller 182 executes the first program in the first and second processors 181-1 and 181-2 so that a cell search process on data is executed in a parallel manner.

As described above, in the first exemplary embodiment of the present disclosure, the cell search process is executed in a parallel manner by using not only the first processor 181-1 but also the second processor 181-2. In this case, the second processor 181-2 is a processor configured to perform, for example, a demodulation process and a decoding process. Since the cell search process is executed in a parallel manner by using the second processor 181-2, the processing time may be reduced as compared to a case where the cell search process is executed by only the first processor 181-1. Accordingly, in the wireless device 100, a processing time of the cell search process from the initiation of the band search process until the termination of the initial cell search process may become shorter than a predetermined time. As a result, a time from a service initiation request until service initiation may also become shorter than a predetermined time.

The specific number of times of executing processing will be described below.

For example, the number of times of correlation operations in a band search is as follows. That is, in a case of Operating Band 1 in a 3G system, a bandwidth is 60 MHz in a range of 2110 MHz to 2170 MHz. A frequency available in the bandwidth ranges from 2112.4 MHz to 2167 MHz, and a channel raster is 200 KHz. Thus, the number of bands is (2167.6−2112.4)/0.2=276. That is, in the 3G system, in a case of Operating Band 1, in the band search, the correlation operation may be performed 276 times.

In the LTE system, in a case of Operating Band 1, a bandwidth is 60 MHz in a range of 2110 MHz to 2170 MHz, and a channel raster is 100 KHz. Thus, the number of bands is 60/0.1=600. That is, in the LTE system, in a case of Operating Band 1, in the band search, the correlation operation may be performed 600 times.

In this manner, when the band search is sequentially performed, for example, the number of correlation operations may be 276 or 600.

In the wireless device 100 of the present disclosure, in the first and second processors 181-1 and 181-2, the first program is executed so that cell search processing on data is executed in a parallel manner. Accordingly, in the wireless device 100 of the present disclosure, since the band search process is performed by the plurality of processors 181-1 and 181-2 in a parallel manner, the number of correlation operations in the band search process may be smaller than 276 (3G system) or 600 (LTE system).

Meanwhile, for example, the number of correlation operations for specifying scrambling codes is as follows.

That is, a second synchronizing signal transmitted by an S-SCH in the 3G system is subjected to a scrambling process by any one of 512 types of scrambling codes. Accordingly, the communication terminal performs at least 512 correlation operations in order to specify 512 types of scrambling codes.

A second synchronizing signal transmitted by an S-SCH in the LTE system is subjected to a scrambling process by, for example, any one of 8 types of scrambling codes. Accordingly, the communication terminal performs at least 8 correlation operations in order to specify 8 types of scrambling codes.

Accordingly, when the correlation operation for specifying a scrambling code is sequentially performed, for example, the number of correlation operations may be 512 (3G system) or 8 (LTE system).

In the wireless device 100 of the present disclosure, since in the first and second processors 181-1 and 181-2, the cell search process is performed in a parallel manner, the number of correlation operations for specifying a scrambling code may also be smaller than 512 (3G system) or 8 (LTE system).

As described above, in the wireless device 100, the number of correlation operations when the band search is performed or the number of correlation operations when the scrambling code is specified may be smaller than a predetermined number. Thus, a time required for a cell search process may also be shorter than a predetermined time.

It is possible to perform the above described processing without adding a circuit for executing the above described processing on the wireless device 100.

Accordingly, in the wireless device 100 of the present disclosure, a time until a service is provided may be shorter than a predetermined time while suppressing an increase of a circuit scale. Also, in the wireless device 100 of the present disclosure, a time from the initiation of the band search process until the termination of the initial cell search process may be shorter than a predetermined time while suppressing an increase of a circuit scale.

[Second Exemplary Embodiment]

Hereinafter, a second exemplary embodiment will be described.

<Exemplary Configuration of Wireless Communication System>

Figure 2:
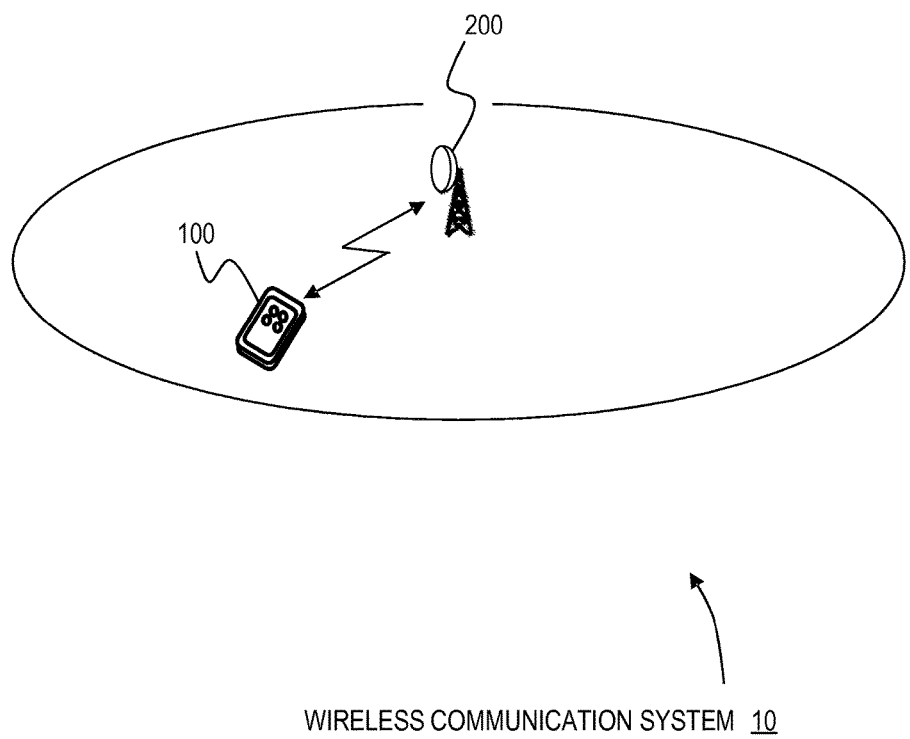
FIG. 2 is a diagram illustrating an example of a configuration of a wireless communication system, according to an embodiment.

First, an exemplary configuration of a wireless communication system will be described. FIG. 2 illustrates an exemplary configuration of a wireless communication system 10. The wireless communication system 10 includes a mobile terminal device 100 and a wireless base station device (hereinafter, may be referred to as a base station) 200.

The mobile terminal device 100 is a wireless device, such as a smart phone, a feature phone, a personal computer, and a tablet. The mobile terminal device 100 performs a wireless communication with the base station 200 in a communicable range of the base station 200 (hereinafter, may be referred to as a cell). Accordingly, for example, the mobile terminal device 100 may be provided with various services such as a call service or a web-page browsing service.

The base station 200 is the other wireless device capable of performing a wireless communication with the mobile terminal device 100 in the cell thereof. The base station 200 may perform a wireless communication with a plurality of mobile terminal devices 100 in a parallel manner. The base station 200 may be connected to a wired line, such as a public network, so as to exchange packet data, such as an internet protocol (IP) packet, with a server apparatus.

The base station 200 performs a scheduling control on a downlink communication (e.g., a communication direction from the base station 200 to the mobile terminal device 100) and an uplink communication (e.g., a communication direction from the mobile terminal device 100 to the base station 200) in a wireless section. The base station 200 generates a control signal including, for example, a scheduling result, and transmits the control signal to the mobile terminal device 100. The mobile terminal device 100 performs a wireless communication according to the control signal.

Figures 27A, 27B:
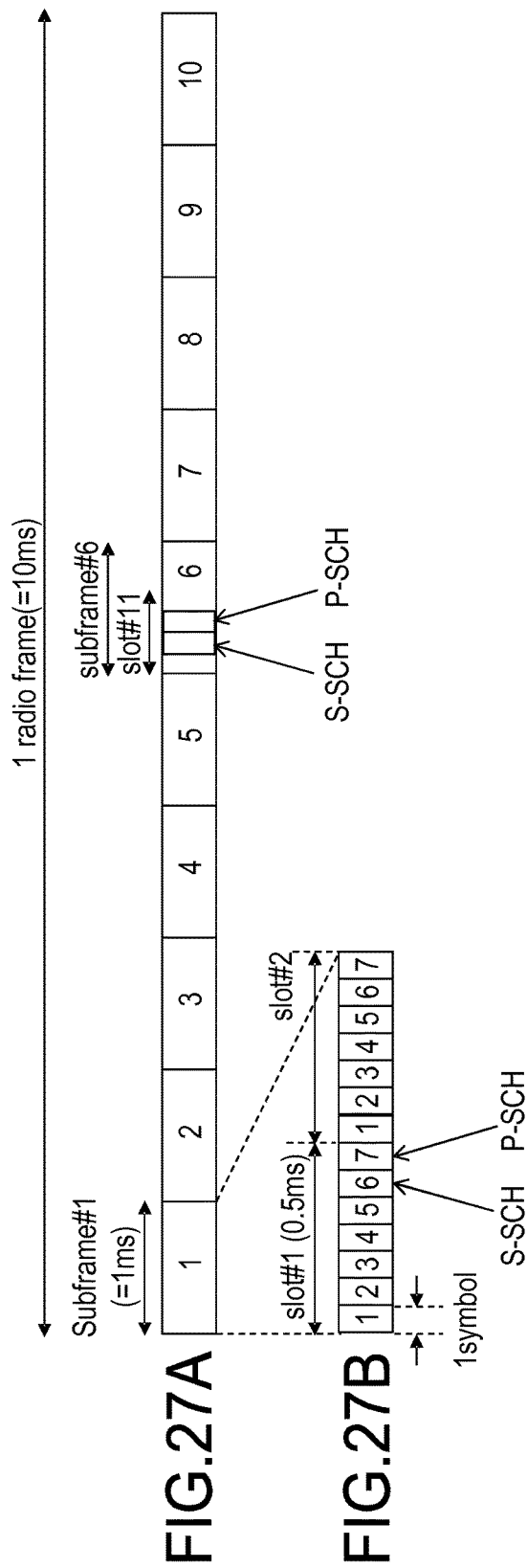
FIGS. 27A and 27B are diagrams illustrating an example of a configuration of a radio frame.

The base station 200 transmits, for example, data or a control signal to the mobile terminal device 100 by using a radio frame. As described above, FIGS. 26A and 26B illustrate an exemplary configuration of a radio frame in a 3G system, and FIGS. 27A and 27B illustrate an exemplary configuration of a radio frame in an LTE system.

In the 3G system, a head symbol of each slot includes a P-SCH and an S-SCH. The base station 200 transmits a first synchronizing signal (PSC) and a second synchronizing signal (SSC) by using the P-SCH and the S-SCH at one slot interval (e.g., 666.6 μs).

In the LTE system, the $6^{th}$ and $7^{th}$ symbols of the first slot as the head slot include an S-SCH and a P-SCH, respectively. The $6^{th}$ and $7^{th}$ symbols of an $11^{th}$ slot from the head include an S-SCH and a P-SCH, respectively. The base station 200 transmits a first synchronizing signal (PSS) and a second synchronizing signal (SSS) at a 5 sub-frame interval (e.g., 5 ms).

The mobile terminal device 100 performs a cell search process by using the first synchronizing signal (PSC or PSS) and the second synchronizing signal (SSC or SSS). The mobile terminal device 100 may detect a symbol timing or a frame timing with respect to the base station 200 suitable for performing a wireless communication, through the cell search process.

The mobile terminal device 100 is also an example of a software wireless device. The software wireless device 100 is a wireless device capable of changing, for example, a communication scheme by changing software without changing, for example, an electronic circuit or hardware. The mobile terminal device 100 may switch a communication scheme from a 3G system to an LTE system or from an LTE system to a 3G system without changing hardware.

Hereinafter, the mobile terminal device 100 may be also referred to as a wireless device 100.

In the second exemplary embodiment of the present disclosure, a communication scheme, such as W-CDMA or CDMA2000, is referred to as, for example, a 3G system. Also, a communication scheme using LTE is referred to as, for example, an LTE system.

In the second exemplary embodiment of the present disclosure, the band search process and the initial cell search process may be also collectively referred to as a cell search process.

As described above, the band search process is a process performed before the initial cell search process in order to specify a carrier frequency used in a wireless communication. Also, the initial cell search process is a process for detecting, for example, a frame timing or a symbol timing on the carrier frequency specified by the band search process to acquire cell-specific information (hereinafter, may be also referred to as cell information), such as a use frequency or a cell ID. Detailed descriptions of each process will be made below.

<Exemplary Configuration of Wireless Device 100>

Figure 3:
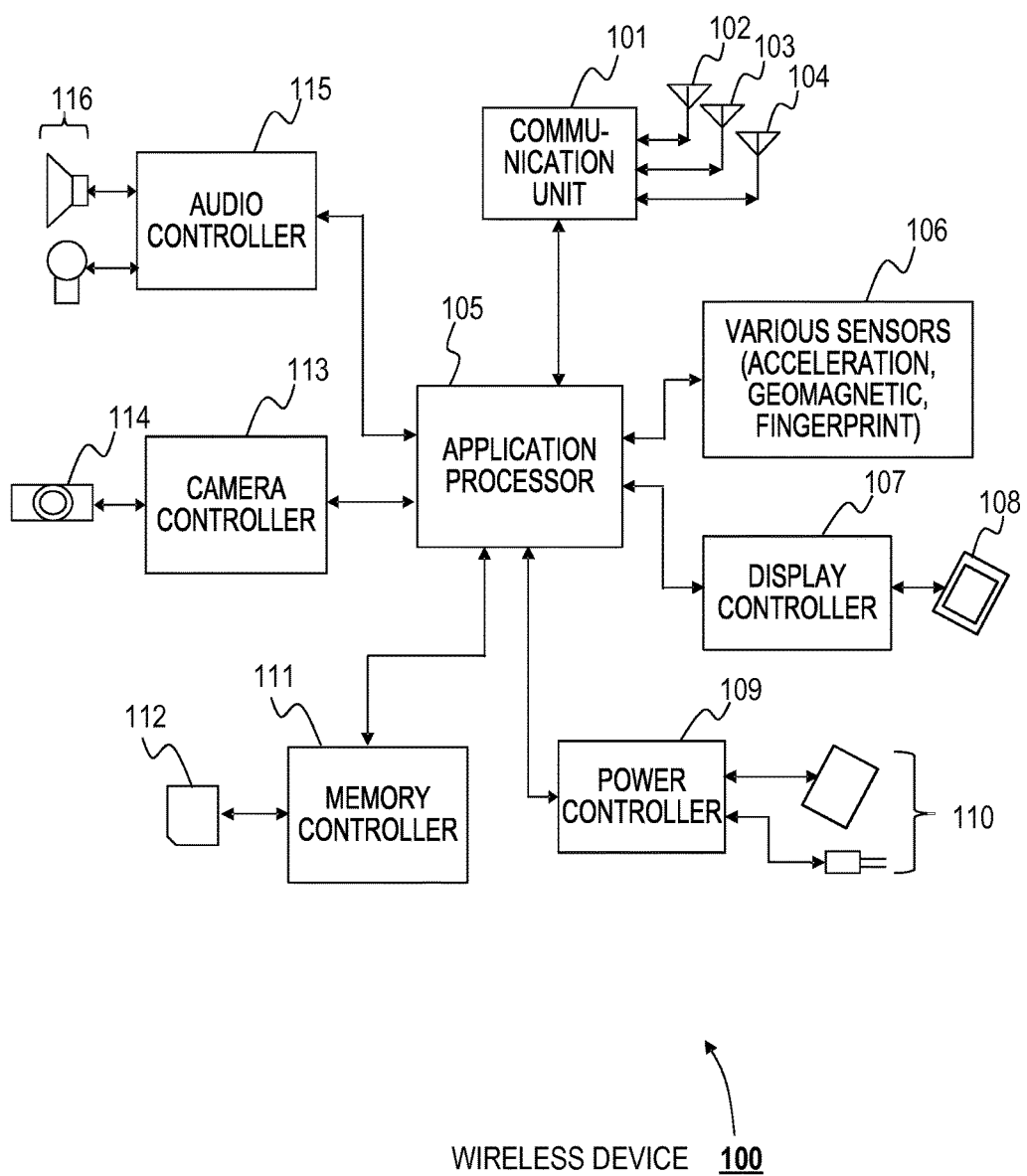
FIG. 3 is a diagram illustrating an example of a configuration of a wireless device, according to an embodiment.

FIG. 3 illustrates an exemplary configuration of a wireless device 100.

The wireless device 100 includes a communication unit 101, antennas 102 to 104, an application processor 105, various sensors 106, a display controller 107, a display unit 108, a power controller 109, and an outlet/battery 110. The wireless device 100 also includes a memory controller 111, a portable memory 112, a camera controller 113, a camera unit 114, an audio controller 115, and a microphone/speaker 116.

The communication unit 101 performs, for example, a frequency conversion process, a demodulation process, or a decoding process on a radio signal received by the antennas 102 to 104 to restore, for example, user data. The communication unit 101 outputs, for example, the restored user data to the application processor 105. Also, the communication unit 101 performs an encoding process, a demodulation process, or a frequency conversion process on, for example, the user data output from the application processor 105 to convert the data into a radio signal and to output the radio signal to the antennas 102 to 104. Then, in the communication unit 101, the cell search process is performed. Detailed descriptions of the communication unit 101 will be made below.

The antennas 102 to 104 include, for example, an antenna 102 configured to transmit a radio signal of a 3G system or an LTE system, an antenna 103 of a wireless fidelity (WIFI) system, and an antenna 104 of another communication scheme. The number of antennas 102 to 104 may be, for example, one or more.

The application processor 105 is connected to the communication unit 101, the various sensors 106, the display controller 107, the power controller 109, the memory controller 111, the camera controller 113, and the audio controller 115. The application processor 105 executes, for example, various application programs and exchanges, for example, user data with the communication unit 101, the various sensors 106, or the display controller 107.

The various sensors 106 may be sensors such as an acceleration sensor or a geomagnetic sensor. The various sensors 106 operate by an instruction of the application processor 105 and output, for example, detected values, to the application processor 105.

The display controller 107 outputs user data such as text data or image data, output from the application processor 105, to the display unit 108, and detects, for example, operation information operated on the display unit 108 to output the detected information to the application processor 105.

The display unit 108 is, for example, a liquid crystal display, and displays, for example, a text or an image according to text data or image data received from the display controller 107. On the display unit 108, for example, various buttons are displayed so that operation information according to user operation is created to be output to the display controller 107.

The power controller 109 controls the outlet/battery 110 such that, for example, a power of the battery 110 is turned on or off.

The memory controller 111 controls, for example, writing or reading of data in the portable memory 112 mounted in the wireless device 100. The memory controller 111 may be connected to, for example, another memory within the wireless device 100 besides the portable memory 112 so as to control another memory.

The camera controller 113 controls, for example, a camera function of the camera unit 114 according to an instruction from the application processor 105. For example, the camera controller 113 outputs, for example, image data captured by the camera unit 114 to the application processor 105.

The audio controller 115 controls, for example, the microphone/speaker 116 so that, for example, voice data received from the application processor 105 is output to the speaker 116 and voice data received from the microphone 116 is output to the application processor 105.

<Exemplary Configuration of Communication Unit 101>

Figure 4:
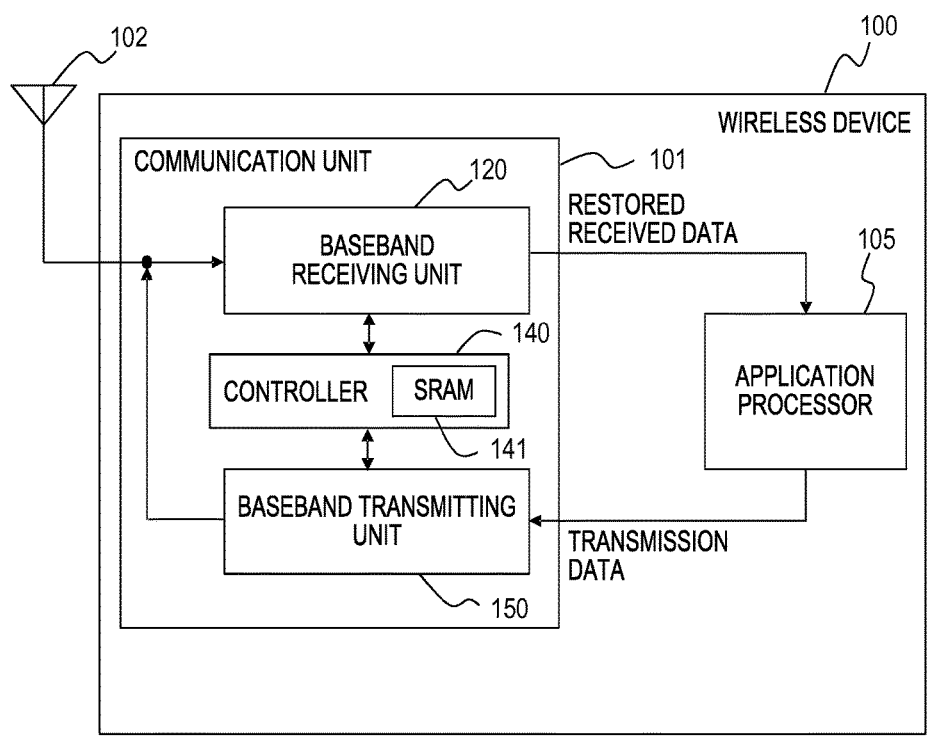
FIG. 4 is a diagram illustrating an example of a configuration of a wireless device, according to an embodiment.

Hereinafter, an exemplary configuration of the communication unit 101 will be described. FIG. 4 illustrates an exemplary configuration of a communication unit 101.

The communication unit 101 includes a baseband receiving unit 120, a controller 140, and a baseband transmitting unit 150.

The baseband receiving unit 120 receives a radio signal from the antenna 102 and performs, for example, a frequency conversion process, a demodulation process or an error correction decoding process on the radio signal so as to restore data. The baseband receiving unit 120 outputs the restored data to the application processor 105.

The baseband transmitting unit 150 receives data transmitted from the application processor 105 and performs, for example, an error correction encoding process, a modulation process, or a frequency conversion process on the transmitted data so as to generate a radio signal. The baseband transmitting unit 150 outputs the radio signal to the antenna 102.

The controller 140 controls the baseband receiving unit 120 and the baseband transmitting unit 150. For example, the controller 140 outputs a mode signal to the baseband receiving unit 120 and the baseband transmitting unit 150. The mode signal is, for example, a signal which indicates initiation of the cell search process or a signal which indicates initiation of a general process. The controller 140 may control the baseband receiving unit 120 and the baseband transmitting unit 150 by a mode signal.

The controller 140 includes a static random access memory (SRAM) 141. The SRAM 141 stores, for example, a cell search program for executing the cell search process, a demodulation processing program for executing the demodulation process, and a decoding program for executing the error correction decoding process. The controller 140 reads out the programs and downloads (or outputs) the programs to the baseband receiving unit 120. The baseband receiving unit 120 executes the cell search process, the demodulation process, or the error correction decoding process by executing the downloaded programs.

The SRAM 141 stores programs for executing, for example, the modulation process or the error correction encoding process. The controller 140 reads out the programs and downloads the programs to the baseband transmitting unit 150. Then, the baseband transmitting unit 150 is able to execute, for example, the modulation process or the encoding process by executing the downloaded programs.

Hereinafter, descriptions will be made on 1) an exemplary configuration of the baseband receiving unit 120 and 2) an exemplary configuration of the baseband transmitting unit 150.

<1. Exemplary Configuration of Baseband Receiving Unit 120>

Figure 5:
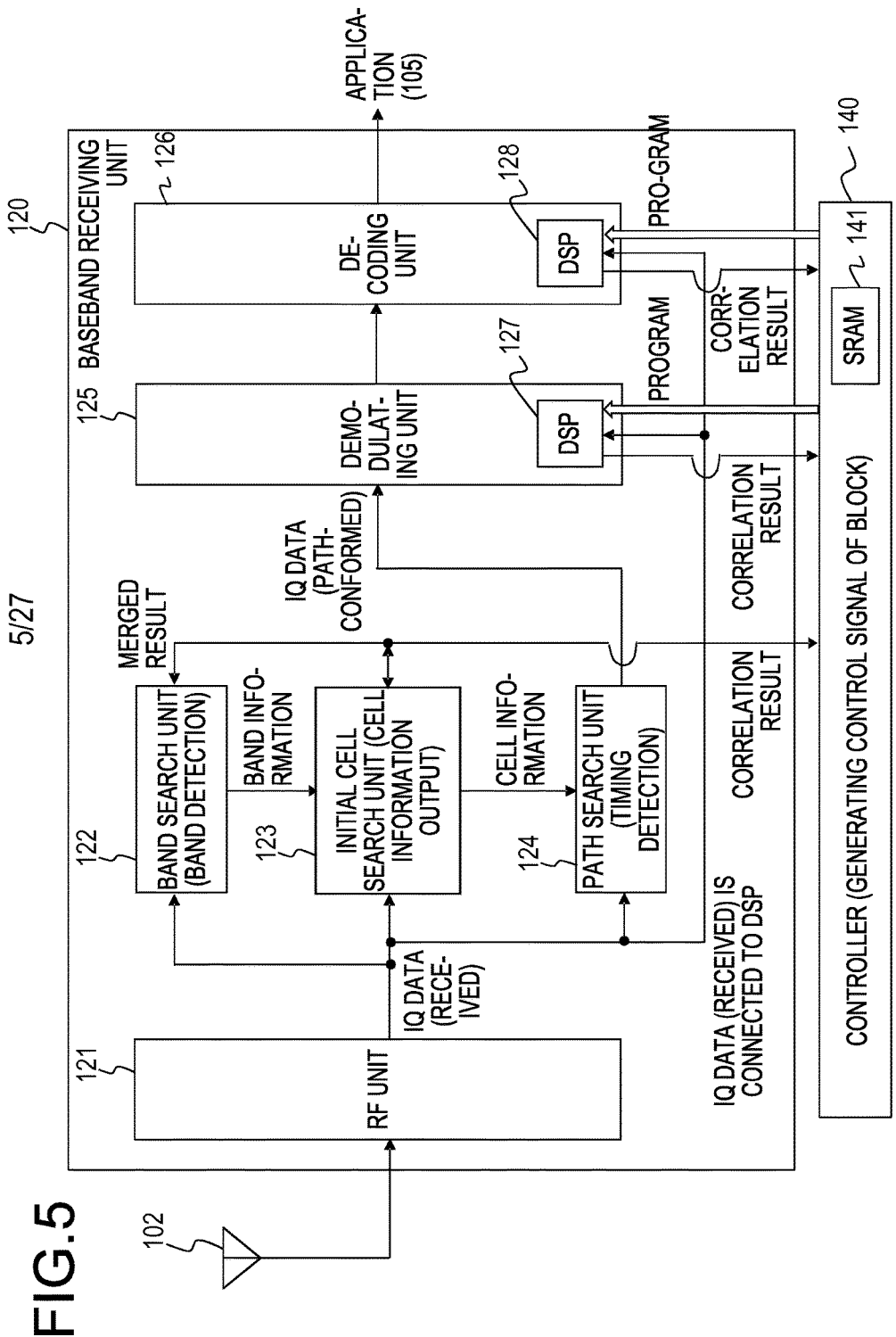
FIG. 5 is a diagram illustrating an example of a configuration of a baseband receiving unit, according to an embodiment.

FIG. 5 illustrates an exemplary configuration of a baseband receiving unit 120.

The baseband receiving unit 120 includes a radio frequency (RF) unit 121, a band search unit 122, an initial cell search unit 123, a path search unit 124, a demodulating unit 125, and a decoding unit 126.

The RF unit 121 includes, for example, a low noise amplification circuit, a frequency conversion circuit, and an automatic gain control (AGC) circuit, and converts the radio signal received from the antenna 102 into IQ data having two component systems of an I-phase component (in-phase component) and a Q-phase component (quadrature component). The RF unit 121 outputs the IQ data to the band search unit 122, the initial cell search unit 123, and the path search unit 124. Also, the RF unit 121 may output the IQ data to the demodulating unit 125 and the decoding unit 126. Also, the RF unit 121 may output the IQ data to the baseband transmitting unit 150.

The band search unit 122 performs a band search process on the IQ data received from the RF unit 121, and outputs band information detected by the band search process to the initial cell search unit 123. Details of the band search process will be described below. The band information includes, for example, a carrier frequency used for transmitting or receiving the radio signal in the wireless device 100.

The band search unit 122 is constituted by a digital signal processor (DSP) so that the band search process may be performed in the DSP. Here, the band search unit 122 downloads the band search program stored in the SRAM 141 of the controller 140 and executes the downloaded band search program in the DSP to perform the band search process. An exemplary configuration of the band search unit 122 will be described below.

The initial cell search unit 123 performs an initial cell search process according to IQ data received from the RF unit 121 and band information received from the band search unit 122, and outputs the cell information detected by the initial cell search process to the path search unit 124. Details of the initial cell search process will be described below. The band information includes, for example, information such as a symbol timing, a frame timing, and a cell ID.

The initial cell search unit 123 may be constituted by a DSP so that the initial cell search process may be performed in the DSP. Here, the initial cell search unit 123 downloads the initial cell search program stored in the SRAM 141 of the controller 140 and executes the downloaded initial cell search program in the DSP to perform the initial cell search process. An exemplary configuration of the initial cell search unit 123 will be described below.

The path search unit 124 specifies, for example, a head position of the IQ data received from the RF unit 121, and performs a process of synchronizing the specified head position with a frame timing or a symbol timing according to cell information received from the initial cell search unit 123. The path search unit 124 outputs the IQ data which has been synchronized (or path-conformed), to the demodulating unit 125.

The demodulating unit 125 performs a demodulation process on the path-conformed IQ data and outputs the demodulated likelihood data to the decoding unit 126. The demodulating unit 125 is provided with a DSP 127 so that the demodulation process is performed in the DSP 127. The DSP 127 receives the demodulation processing program from the SRAM 141 and executes the received demodulation processing program to perform the demodulation process.

The decoding unit 126 receives likelihood data from the demodulating unit 125, and performs an error correction decoding process (hereinafter, may be also referred to as a decoding process) on the received likelihood data. The decoding unit 126 is provided with a DSP 128 so that the decoding process is performed in the DSP 128. The DSP 128 receives the decoding processing program from the SRAM 141 and executes the received decoding processing program to perform the decoding process. The decoding unit 126 outputs the decoded data (or restored data) to the application processor 105.

Hereinafter, exemplary configurations of 1.1) the band search unit 122, 1.2) the initial cell search unit 123, and 1.3) the demodulating unit 125 and the decoding unit 126 will be described.

<1.1 Exemplary Configuration of Band Search Unit 122>

Figure 6:
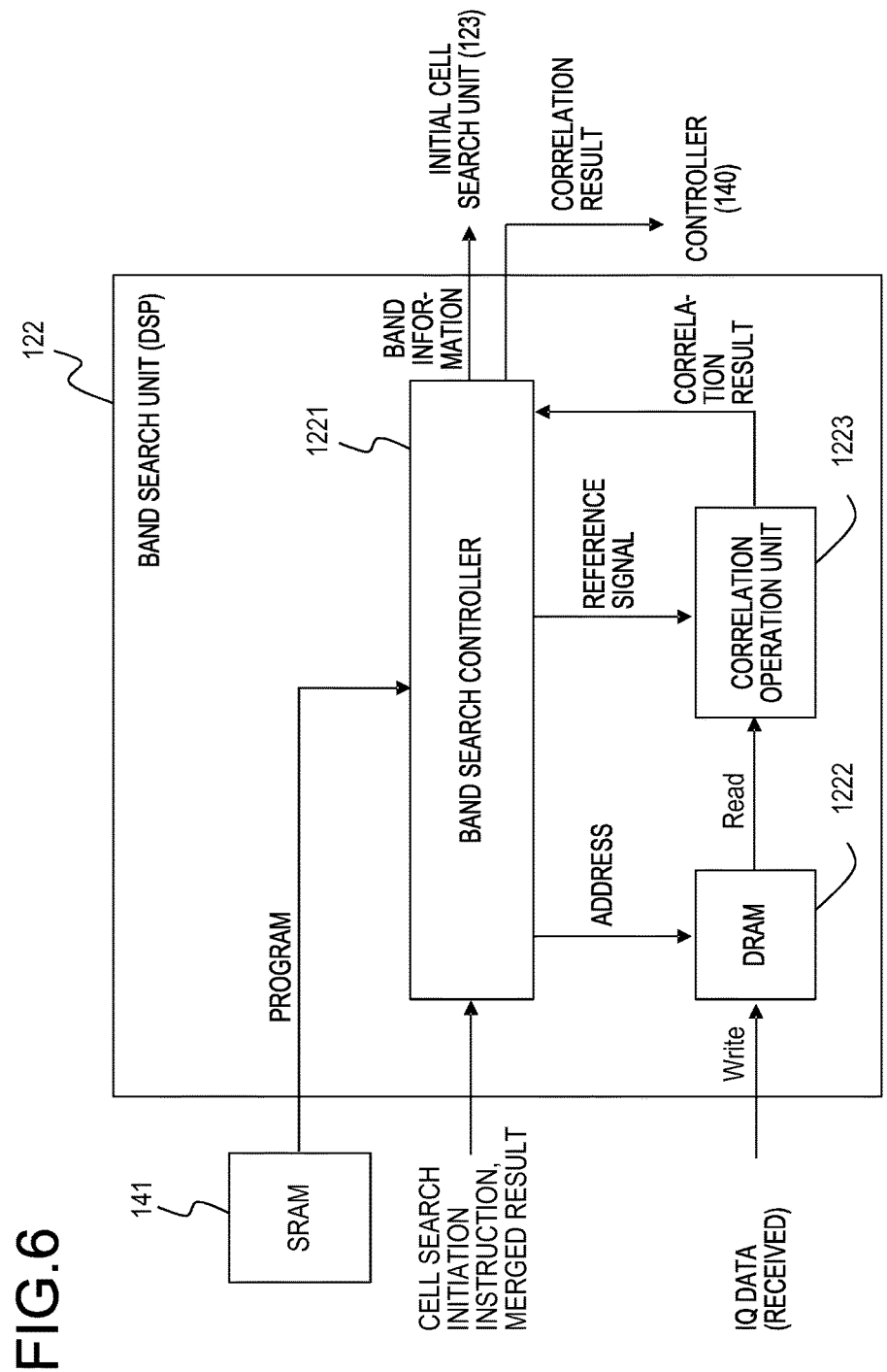
FIG. 6 is a diagram illustrating an example of a configuration of a band search unit, according to an embodiment.

FIG. 6 illustrates an exemplary configuration of a band search unit 122. The band search unit 122 may be constituted by a DSP.

The band search unit 122 includes a band search controller 1221, a dynamic random access memory (DRAM) 1222, and a correlation operation unit 1223.

When receiving a signal (or a mode signal) indicating an instruction of initiating a band search process from the controller 140, the band search controller 1221 receives a band search program from the SRAM 141 of the controller 140, and starts to execute the received band search program. This allows the band search controller 1221 to perform a band search process.

The band search controller 1221 outputs a write address to the DRAM 1222 and stores IQ data in the output address. The band search controller 1221 also outputs a read address to the DRAM 1222, reads out the IQ data stored in the output address from the DRAM 1222, and outputs the IQ data to the correlation operation unit 1223.

The IQ data which is output from the RF unit 121 and stored in the DRAM 1222 is a plurality of IQ data having different center frequencies (or carrier frequencies). For example, the plurality of IQ data may be IQ data in which a center frequency is varied at an interval of 200 KHz in a predetermined frequency band (Operating Band 1 in a range of 2112.4 MHz to 2167 MHz).

In the correlation operation unit 1223, a correlation operation is performed using a reference signal which is a conventionally known signal sequence on the plurality of IQ data. For example, the correlation operation unit 1223 includes a cross-correlation type digital matching filter (or cross-correlation type timing detecting circuit), and a correlation operation is performed by such a circuit. The correlation operation is, for example, a self-correlation type operation, and in this case, the correlation operation unit 1223 includes a self-correlation type timing detecting circuit.

In the 3G system, for example, a correlation operation is performed as follows. That is, the correlation operation unit 1223 calculates a product of a conventionally known signal sequence (a signal sequence corresponding to the first synchronizing signal (PSC)) as a reference signal, and each of the plurality of IQ data read out from the DRAM 1222 for each sample, and adds the calculated products. Here, the correlation operation unit 1223 divides a section (666.6 μs) for integrating correlation values for each sample into a plurality of blocks, and calculates a correlation value in each block, and multiply complex conjugates of correlation values in adjacent blocks. The correlation operation unit 1223 outputs the value obtained by addition, as a correlation result, to the band search controller 1221.

The LTE system is the same as the 3G system except that, for example, a section for integrating correlation values for each sample is 5 ms, and a conventionally known signal sequence corresponding to the first synchronizing signal (PSS) is used as for a reference signal.

For example, the reference signal which is the conventionally known signal sequence may be stored in the memory within the band search controller 1221 (or the band search unit 122).

The band search controller 1221 receives the correlation result from a correlation operation unit 1223, obtains the highest correlation result among a plurality of correlation results, and outputs a center frequency (or carrier frequency) of IQ data from which the corresponding correlation result is obtained as band information, to the initial cell search unit 123.

The band search process may be performed in a plurality of DSPs, such as DSP of the band search unit 122, the DSP 127 of the demodulating unit 125, and the DSP 128 of the decoding unit 126. In this case, the band search unit 122 performs a part of the band search process and outputs the correlation result to the controller 140. Other DSPs 127 and 128 also process other parts of the band search process, and output the correlation results to the controller 140. The controller 140 outputs a merged result obtained by merging (or combining) correlation results to the band search unit 122 in which an original band search process is performed. The band search controller 1221 receives the merged result, detects, for example, a carrier frequency having the highest correlation as band information and outputs the detected carrier frequency to the initial cell search unit 123. Details of the band search process will be described below.

<1.2 Exemplary Configuration of Initial Cell Search Unit 123>

Figure 7:
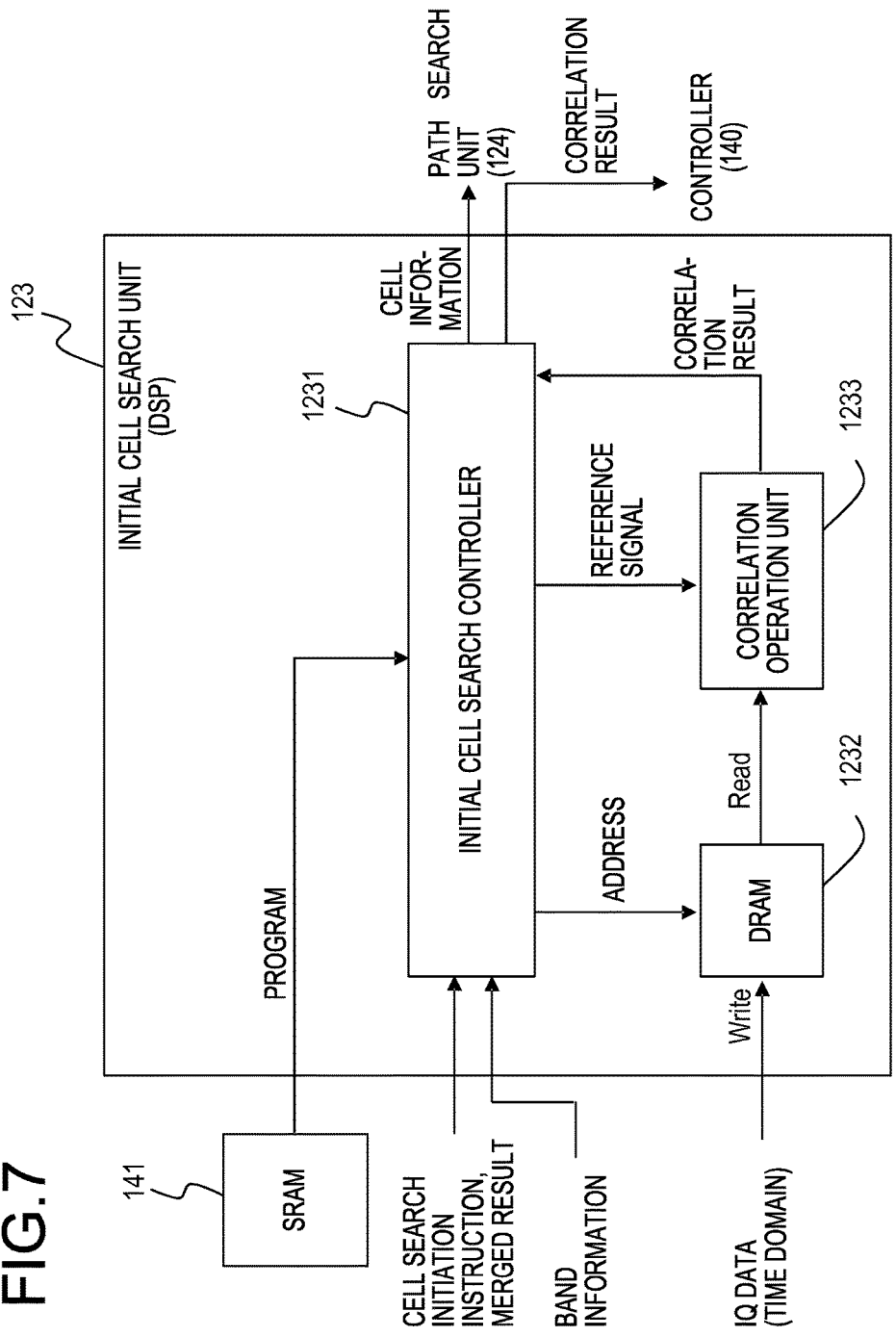
FIG. 7 is a diagram illustrating an example of a configuration of an initial cell search unit, according to an embodiment.

Hereinafter, an exemplary configuration of the initial cell search unit 123 will be described. FIG. 7 illustrates an exemplary configuration of the initial cell search unit 123.

As illustrated in FIG. 7, the initial cell search unit 123 includes an initial cell search controller 1231, a DRAM 1232, and a correlation operation unit 1233.

When receiving a signal (or a mode signal) indicating an instruction of initiating a cell search process from the controller 140, the initial cell search controller 1231 receives an initial cell search program from the SRAM 141 of the controller 140, and starts to execute the received initial cell search program. This allows the initial cell search controller 1231 to perform an initial cell search process.

The initial cell search controller 1231 outputs a write address to the DRAM 1232 and stores IQ data in the output address. The initial cell search controller 1231 also outputs a read address to the DRAM 1232, and reads out the IQ data having a frequency corresponding to the band information received from the band search unit 122 among the IQ data stored in the DRAM 1232. Accordingly, for example, the band search controller 1221 may read out IQ data having a frequency corresponding to the carrier frequency among the plurality of IQ data, and may efficiently read out IQ data as a cell search processing target.

The correlation operation unit 1233 performs a correlation operation by using a reference signal which is a conventionally known signal sequence, on the IQ data read out from the DRAM 1232. For example, the correlation operation unit 1233 may include a cross-correlation type digital matching filter or a self-correlation type timing detecting circuit like the correlation operation unit 1223 of the band search unit 122. As for the correlation operation, the same processing as that in the correlation operation unit 1223 of the band search unit 122 is performed.

However, as for the reference signal, in the 3G system, a conventionally known signal sequence corresponding to the first synchronizing signal (PSC) and the second synchronizing signal (SSC) is used, and in the LTE system, a conventionally known signal sequence corresponding to the first synchronizing signal (PSS) and the second synchronizing signal (SSS) is used.

Here, the correlation operation unit 1233 performs a correlation operation on IQ data by using a conventionally known signal sequence corresponding to the first synchronizing signal (PSC or PSS) as for a reference signal. The correlation operation unit 1233 performs a correlation operation on IQ data by using a conventionally known signal sequence corresponding to the second synchronizing signal (SSC or SSS) as for a reference signal. In this manner, the correlation operation unit 1233 is configured to detect two types of synchronizing signals included in the IQ data by the reference signal. The correlation operation is the same as the correlation operation performed in the correlation operation unit 1223 of the band search unit 122.

The correlation operation unit 1233 outputs the correlation result to the initial cell search unit 123. The initial cell search controller 1231 detects, for example, a sub-frame timing, a symbol timing, a frame timing, a P-SCH number, and a cell ID according to the correlation result received from the correlation operation unit 1233.

Here, the initial cell search controller 1231 performs a confirmation process (or verifying) on the detected result. When, for example, the detected result is within a threshold range, the initial cell search controller 1231 allows the detected result to be output as cell information to the path search unit 124, whereas when the detected result is out of the range, the initial cell search controller 1231 allows IQ data to be read out again from the DRAM 1232 so that the correlation operation is performed in the correlation operation unit 1233.

The initial cell search process may be performed by a plurality of DSPs, such as a DSP of the initial cell search unit 123, the DSP 127 of the demodulating unit 125, and the DSP 128 of the decoding unit 126. In this case, the initial cell search unit 123 performs a part of the initial cell search process and outputs the correlation result to the controller 140. Other DSPs 127 and 128 also process other parts of the initial cell search process, and output the correlation results to the controller 140. The controller 140 outputs a merged result obtained by merging correlation results to the initial cell search unit 123 in which an original initial cell search process is performed. The initial cell search unit 123 receives the merged result, and detects, for example, a sub-frame timing or a symbol timing. Details of the initial cell search process will be described below.

<1.3 Demodulating Unit 125 and Decoding Unit 126>

Figure 8:
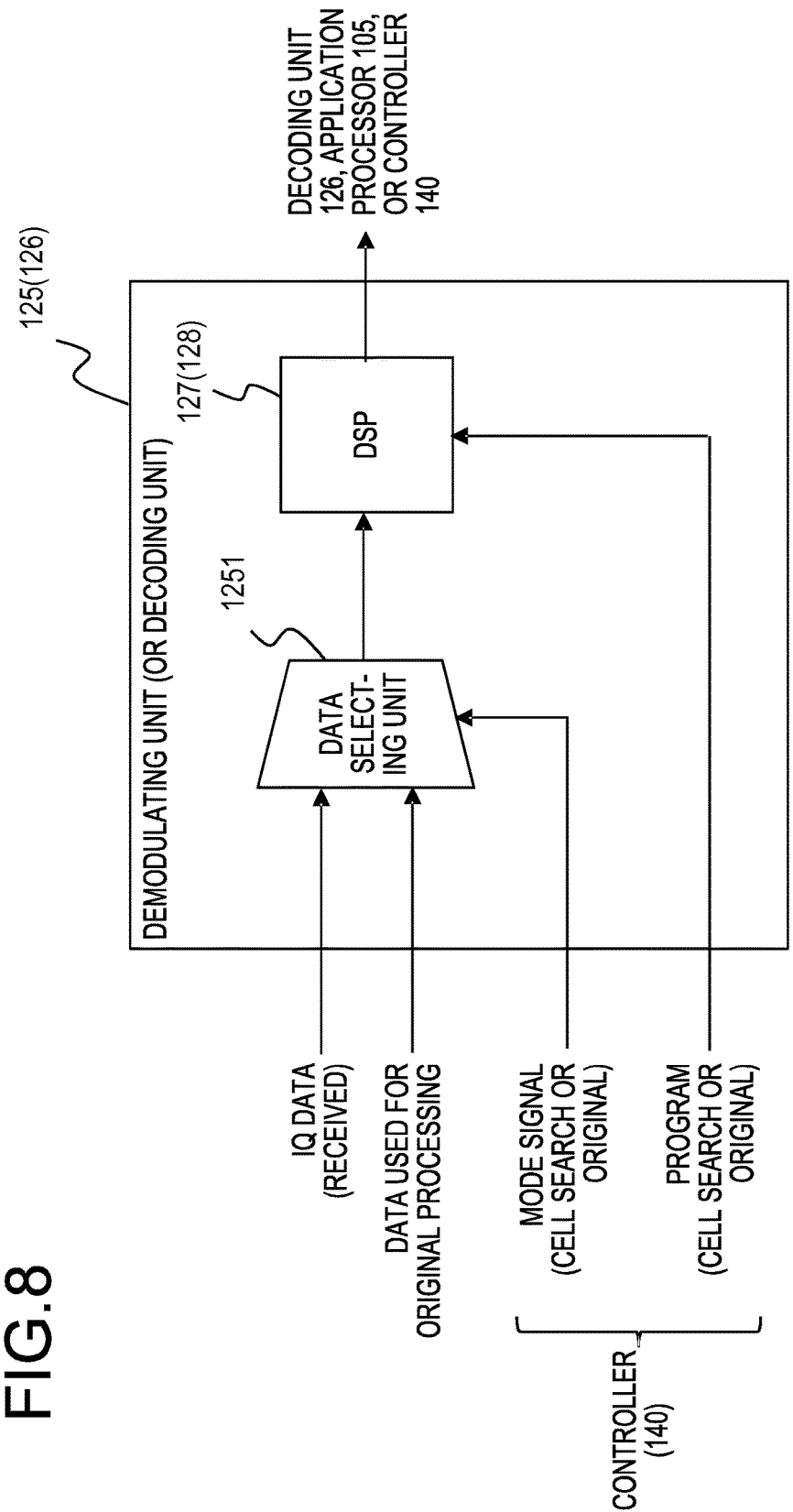
FIG. 8 is a diagram illustrating an example of a configuration of a demodulating unit or a decoding unit, according to an embodiment.

Hereinafter, an exemplary configuration of the demodulating unit 125 and the decoding unit 126 will be described. FIG. 8 illustrates an exemplary configuration of the demodulating unit 125. The demodulating unit 125 has similar configuration as that of the decoding unit 126, and thus the demodulating unit 125 will be representatively described.

The demodulating unit 125 includes a data selecting unit 1251 and a DSP 127.

The data selecting unit 1251 inputs received-IQ data output from the RF unit 121 (hereinafter, may be also referred to as IQ data (received)), and path-conformed IQ data output from the path search unit 124 (hereinafter, may be referred to as IQ data (path-conformed)). Then, the data selecting unit 1251 outputs any one of IQ data (received) and IQ data (path-conformed) according to a mode signal received from the controller 140 to the DSP 127. For example, the data selecting unit 1251 outputs IQ data (received) when the mode signal is a signal indicating an instruction of initiating the cell search process, and the data selecting unit 1251 outputs IQ data (path-conformed) when the mode signal is a signal indicating a general process (or an original process).

The DSP 127 downloads a demodulation program from the SRAM 141 and executes the downloaded demodulation program to perform a demodulation process on IQ data (path-conformed) received from the data selecting unit 1251. The DSP 127 outputs demodulated IQ data (path-conformed) to the decoding unit 126.

The DSP 127 may download a band search program or an initial cell search program (hereinafter, these two programs may be also collectively referred to as "a cell search program") from the SRAM 141. The DSP 127 executes the downloaded cell search program to execute a part of the cell search process on the IQ data (received) received from the data selecting unit 1251. The DSP 127 outputs the correlation result obtained after the cell search process to the controller 140.

Meanwhile, the decoding unit 126 is operated as follows. That is, the data selecting unit 1251 outputs IQ data (received) or likelihood data output from the demodulating unit 125 to the DSP 128 according to a mode signal. For example, the data selecting unit 1251 outputs IQ data (received) when the mode signal is a signal indicating an instruction of initiating the cell search process, and the data selecting unit 1251 outputs likelihood data when the mode signal is a signal indicating a general process.

The DSP 128 may download a decoding processing program from the SRAM 141 and execute the downloaded decoding processing program to perform a decoding process on the likelihood data. The DSP 128 outputs decoded IQ data as restored received data, to the application processor 105.

The DSP 128 may download a cell search program from the SRAM 141 and execute the downloaded cell search program to execute a part of the cell search process on the likelihood data received from the data selecting unit 1251. The DSP 128 outputs, for example, the correlation result obtained after the cell search process, to the controller 140.

<1.3.1 Exemplary Configuration of DSP 127 and 128>

Figure 9:
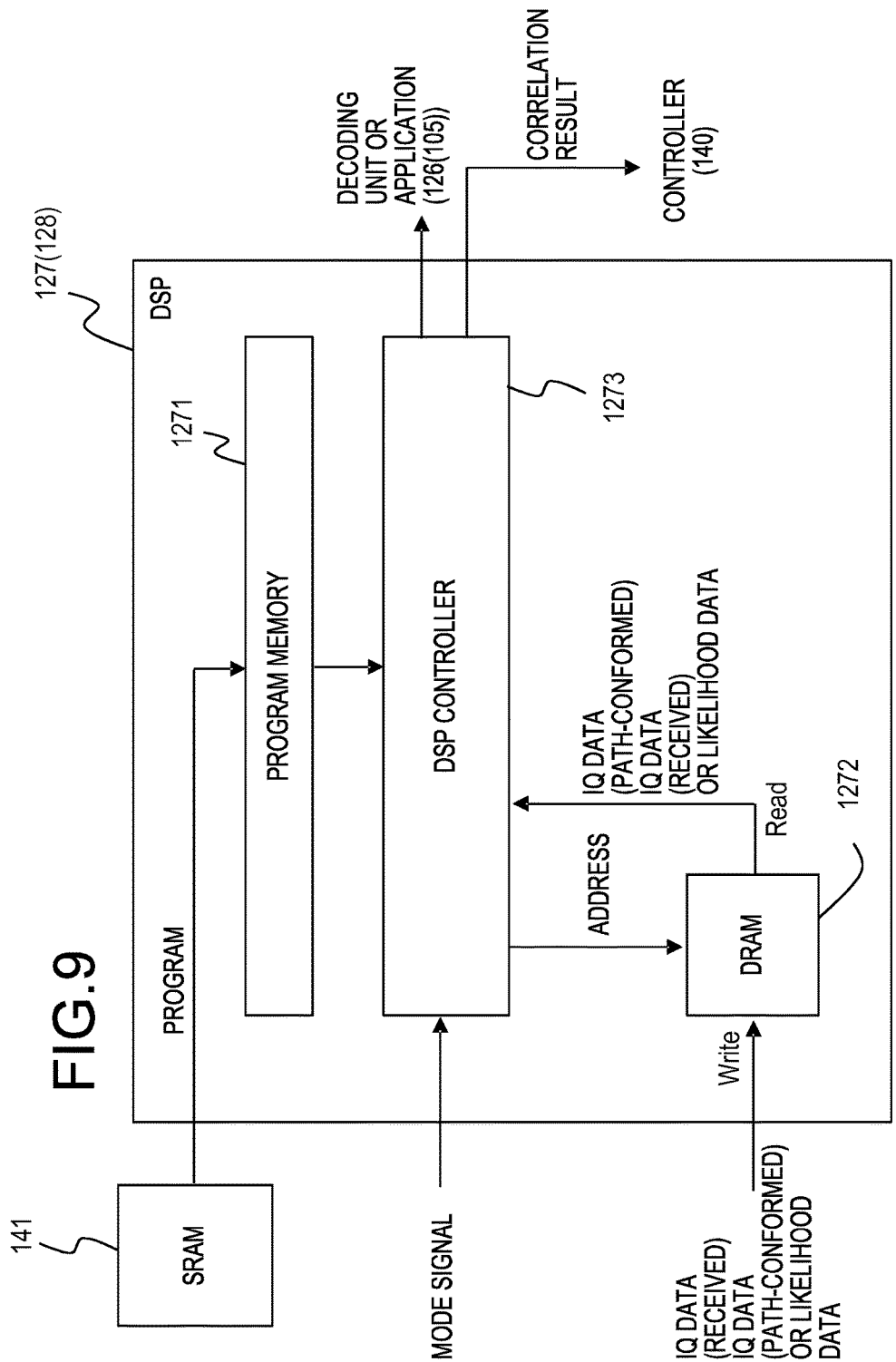
FIG. 9 is a diagram illustrating an example of a configuration of a DSP, according to an embodiment.

Hereinafter, descriptions will be made on an exemplary configuration of the DSP 127 of the demodulating unit 125 and an exemplary configuration of the DSP 128 of the decoding unit 126. FIG. 9 illustrates an exemplary configuration of the DSP 127 and 128. The two DSPs 127 and 128 have similar configurations, and thus the DSP 127 will be representatively described.

The DSP 127 includes a program memory 1271, a DRAM 1272, and a DSP controller 1273.

The program memory 1271 stores a demodulation processing program or a cell search program downloaded from the SRAM 141.

The DRAM 1272 stores, according to a write address received from the DSP controller 1273, IQ data (received) or IQ data (path-conformed) in the corresponding address. Also, in the DRAM 1272, according to a read address received from the DSP controller 1273, IQ data (received) or IQ data (path-conformed) stored the corresponding address is read out.

The DSP controller 1273 reads out the demodulation program or the cell search program from the program memory 1271 according to a mode signal received from the controller 140 to perform a cell search process or a demodulation process.

In the cell search process, the DSP controller 1273 reads out the IQ data (received) from the DRAM 1272 and performs the cell search process. A correlation operation performed during the cell search process is performed by the DSP controller 1273. Here, the DSP controller 1273 performs the correlation operation by using a reference signal but the reference signal may be maintained in, for example, the internal memory. The correlation operation may be the same as, for example, the correlation operation performed in the correlation operation unit 1223 of the band search unit 122 or the correlation operation unit 1233 of the initial cell search unit 123. The DSP controller 1273 outputs the correlation result to the controller 140 so that demodulated IQ data may be output to the decoding unit 126.

Meanwhile, the DSP controller 1273 reads out the IQ data (path-conformed) from the DRAM 1272 while performing the demodulation process.

The DSP 128 is operated in a similar manner. When performing the cell search process, the DSP controller 1273 reads out the cell search program from the program memory 1271 and performs the processing to output the correlation result to the controller 140. When performing the decoding process, the DSP controller 1273 reads out the decoding program from the program memory 1271 and executes the program to perform the decoding process on the likelihood data. The decoded data is output to the application processor 105.

As described above, the exemplary configuration of the baseband receiving unit 120 has been described. Hereinafter, an exemplary path in the baseband receiving unit 120 will be described.

<Exemplary Path>

Figure 10:
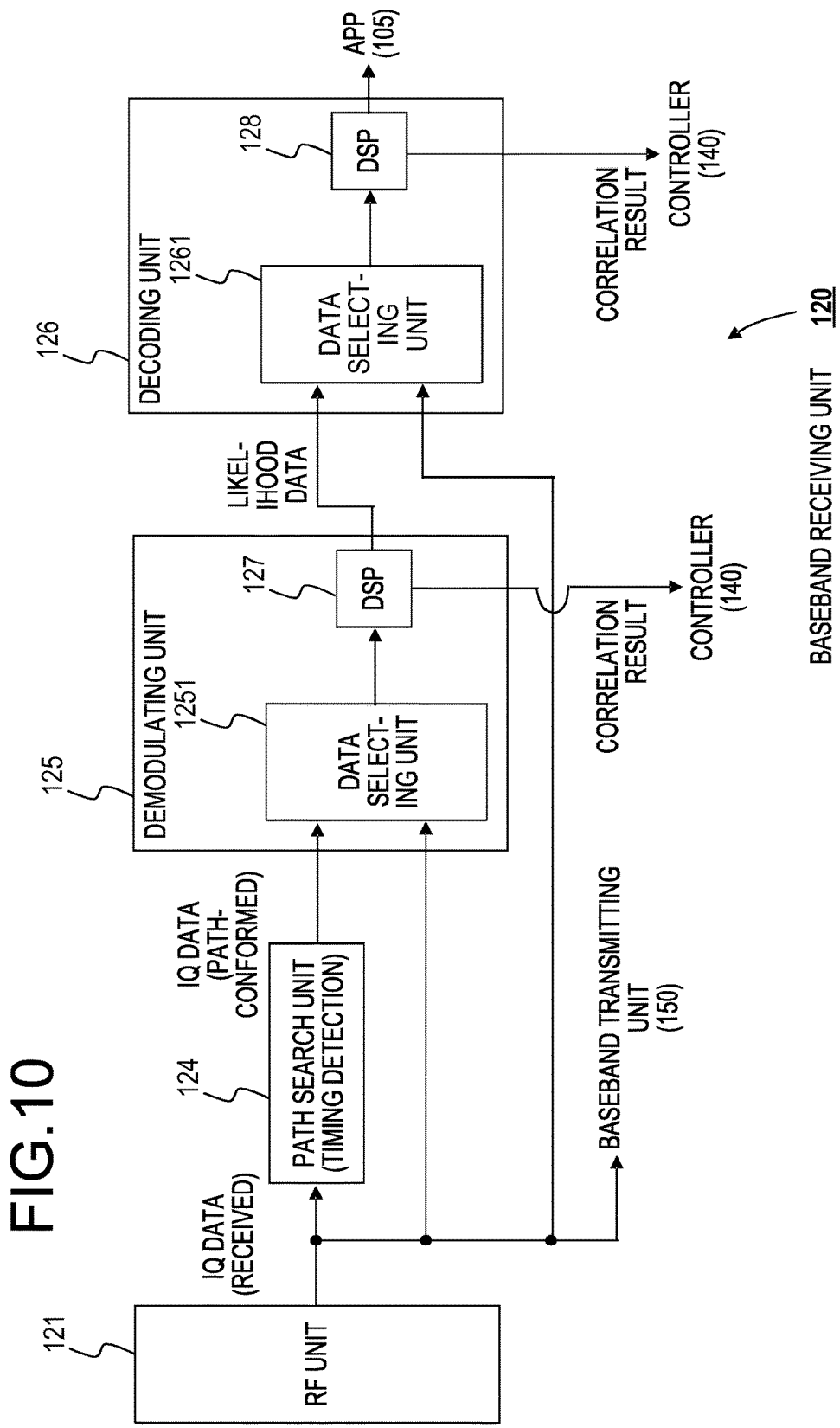
FIG. 10 is a diagram illustrating an example of a path, according to an embodiment.

FIG. 10 illustrates an exemplary path in a baseband receiving unit 120. As illustrated in FIG. 10, there is a general path in which IQ data (received) is input to the path search unit 124 and subjected to a synchronization process, and then output from the demodulating unit 125 to the application processor 105 through the decoding unit 126.

In the wireless device 100 of the present disclosure, there are paths in which IQ data (received) is input to the DSP 127 of the demodulating unit 125 and the DSP 128 of the decoding unit 126 so that the cell search process is performed in the two DSPs 127 and 128. The results (or the correlation results) of the cell search processes in the DSPs 127 and 128 are output to the controller 140.

<2 Exemplary Configuration of Baseband Transmitting Unit 150>

Figure 11:
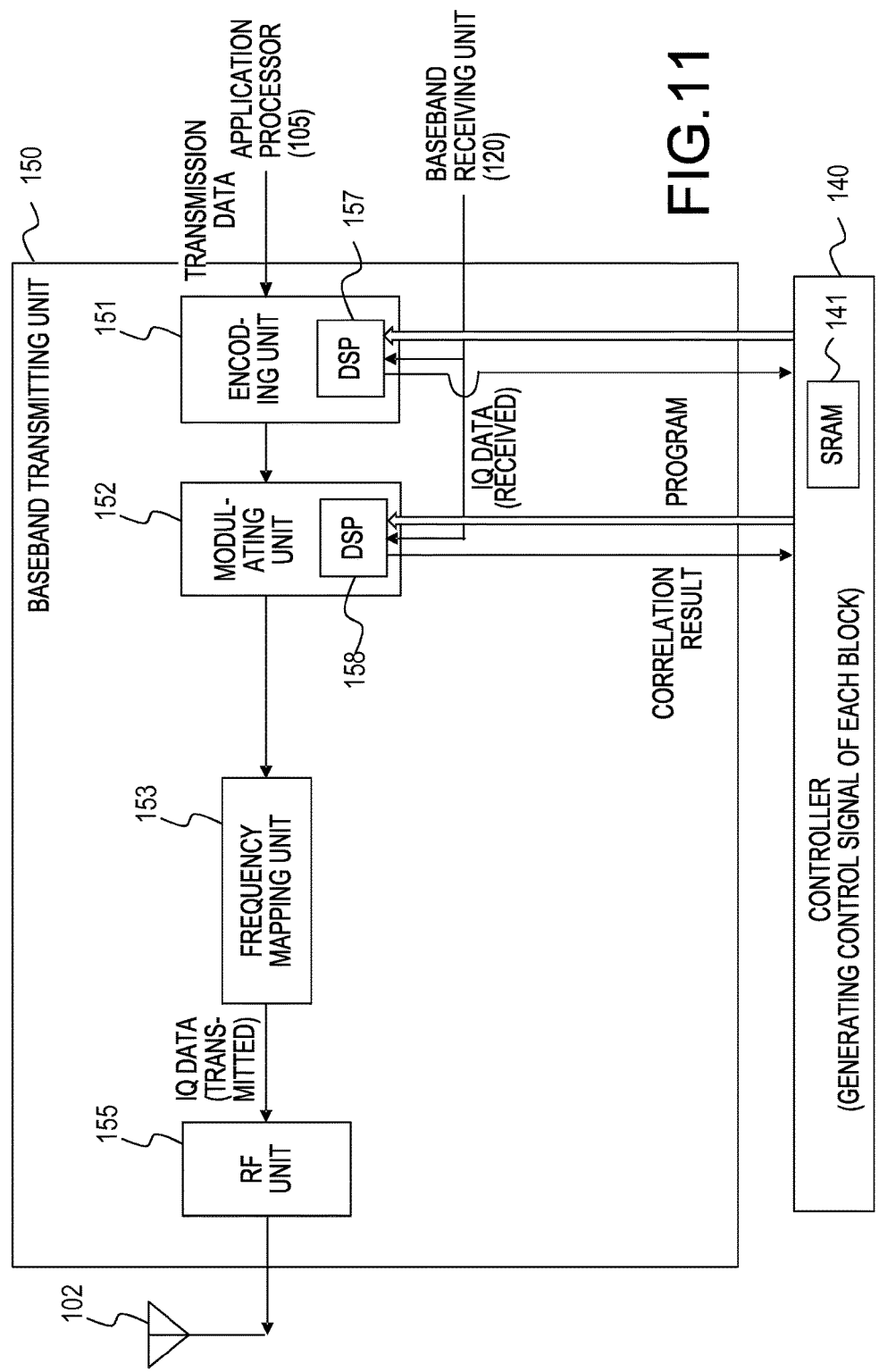
FIG. 11 is a diagram illustrating an example of a configuration of a baseband transmitting unit, according to an embodiment.

Hereinafter, an exemplary configuration of the baseband transmitting unit 150 will be described. FIG. 11 illustrates an exemplary configuration of the baseband transmitting unit 150.

As illustrated in FIG. 11, the baseband transmitting unit 150 includes an encoding unit 151, a modulating unit 152, a frequency mapping unit 153, and an RF unit 155.

The encoding unit 151 receives transmission data from the application processor 105, and performs an error correction encoding process on the transmission data (hereinafter, may be also referred to as an encoding process). The encoding unit 151 is provided with a DSP 157 and downloads an encoding processing program from the SRAM 141 so that the corresponding program is executed by the DSP 157 to perform the encoding process.

The modulating unit 152 performs a modulation process on the encoded transmission data. The modulating unit 152 is also provided with a DSP 158 and downloads a modulation processing program from the SRAM 141 so that the corresponding program is executed by the DSP 158 to perform the modulation process.

The frequency mapping unit 153 performs a frequency mapping process through, for example, an inverse fast Fourier transform (IFFT) process, on the modulated transmission data output from the modulating unit 152. The data output from the frequency mapping unit 153 is output as the IQ data (transmitted) to the RF unit 155.

The RF unit 155 performs addition of a CP, and frequency conversion on the IQ data (transmitted) to convert the IQ data into a radio signal. Then, the converted radio signal is output to the antenna 102.

In the baseband transmitting unit 150, there are two DSPs 157 and 158 of the encoding unit 151 and the modulating unit 152 so that cell search programs are downloaded in relation to the two DSPs 157 and 158 to perform the cell search process. In the following description, as for the DSP for performing the cell search process, for example, a plurality of DSPs within the baseband receiving unit 120 are mainly used. However, the cell search process may be performed using a plurality of DSPs including the DSPs 157 and 158 of the baseband transmitting unit 150. In this case, both of the two DSPs 157 and 158 may be used or any one of them may be used. Also, another DSP within the baseband transmitting unit 150 may be used.

[Operation Example]

Hereinafter, an operation example in the wireless device 100 will be described. First, 1) a band search process and an initial cell search process will be described in detail, and then, 2) the overall operation example in the wireless device 100 of the present disclosure will be described.

<1. Band Search Process and Initial Cell Search Process>

Figure 12:
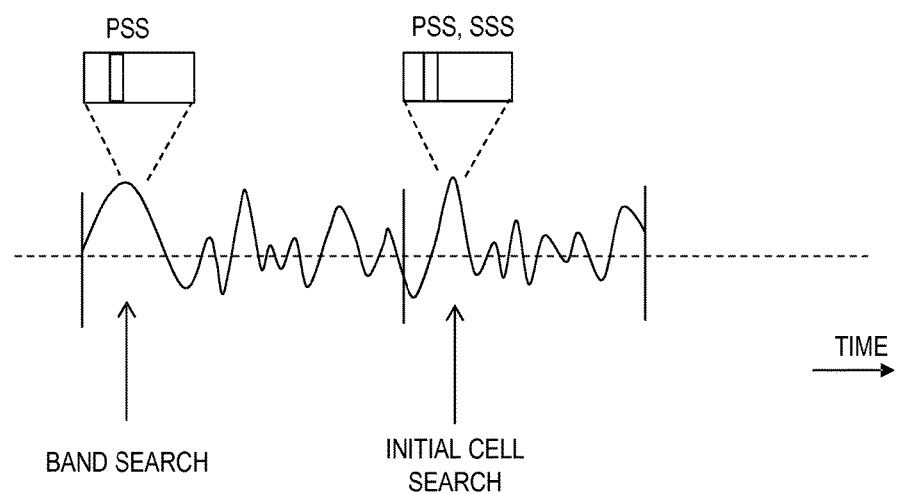
FIG. 12 is a diagram illustrating an example of a radio signal, according to an embodiment.
Figure 13:
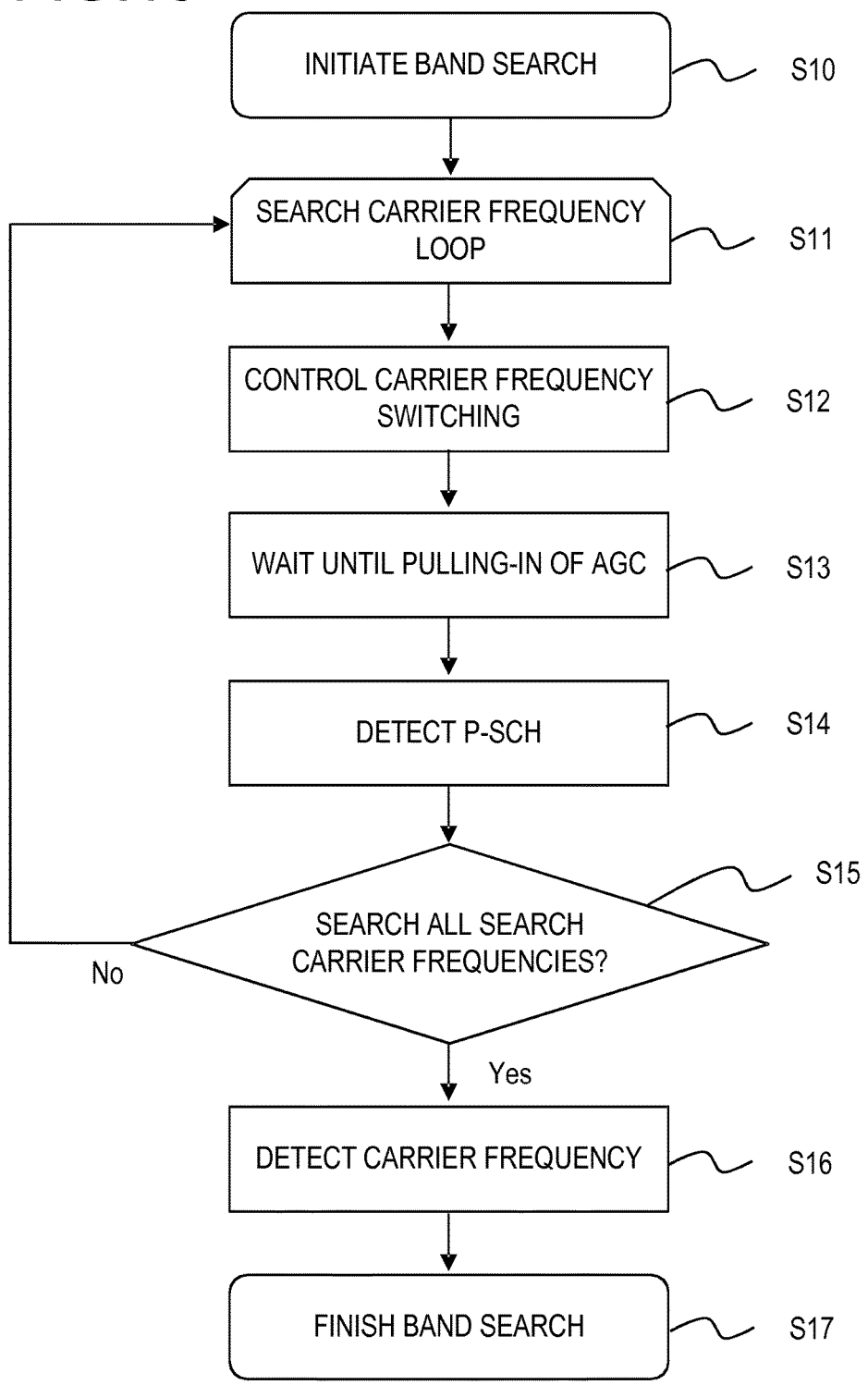
FIG. 13 is a diagram illustrating an example of an operational flowchart for a band search process, according to an embodiment.
Figure 14:
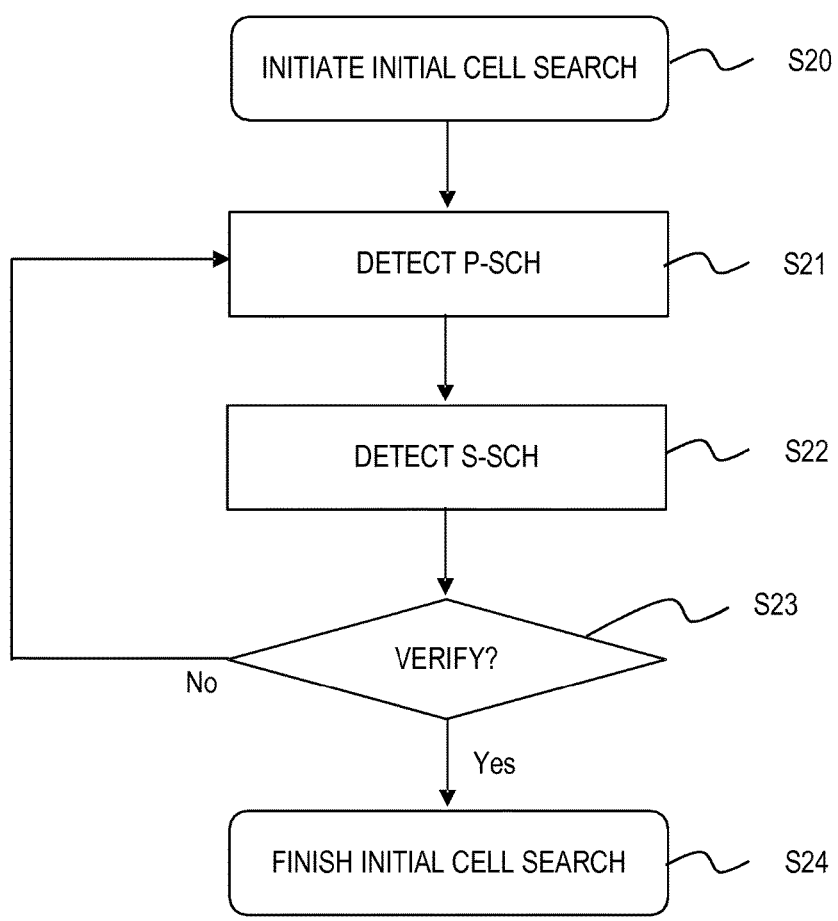
FIG. 14 is a diagram illustrating an example of an operational flowchart for an initial cell search process, according to an embodiment.

FIGS. 12 to 14 are views for explaining each process of the band search process and the initial cell search process. First, a difference between the band search process and the initial cell search process will be described using FIG. 12.

FIG. 12 illustrates an example of a radio signal received at a certain frequency, in which the horizontal axis represents time, and the vertical axis represents power.

As illustrated in FIG. 12, the band search process is performed before, for example, the initial cell search process. The band search process is performed using a first synchronizing signal PSC or PSS to detect a carrier frequency which is to be used by the wireless device 100.

Meanwhile, the initial cell search process is performed after the band search process. In the initial cell search process, a radio signal is detected using the carrier frequency detected by the band search process, and a symbol timing is detected using the first synchronizing signal PSC or PSS included in the detected radio signal. Then, for example, a frame timing is detected using a second synchronizing signal SSC or SSS.

In this manner, the band search process and the initial cell search process are performed at different timings.

Hereinafter, the band search process will be described in detail. FIG. 13 is a flowchart illustrating an operation example of the band search process. The band search process is, for example, a process performed in the RF unit 121 and the band search unit 122.

The RF unit 121 and the band search unit 122 repeat the following process at an initially set frequency (for example, at a lowest frequency in a certain frequency band) as a carrier frequency (S11) when the band search process is initiated (S10).

The RF unit 121 performs a switching control of the carrier frequency (S12). In the first loop, for example, the RF unit 121 leaves the initially set frequency as it is without switching the carrier frequency.

Then, the RF unit 121 waits until pulling-in of an AGC (S13). The RF unit 121 includes the AGC circuit to perform a process of correcting the level of the received radio signal to an appropriate level. In this processing, the RF unit 121 waits until the level of the radio signal reaches the appropriate level, thereafter the next processing is performed.

Then, the band search unit 122 detects the first synchronizing signal PSC or PSS transmitted by a P-SCH (S14).

For example, the processing is as follows. That is, the RF unit 121 (e.g., FIG. 5) performs processing, such as frequency conversion, on the radio signal that has reached the appropriate level to output IQ data (received). The band search controller 1221 (e.g., FIG. 6) stores IQ data (received) in the DRAM 1222 so that the IQ data may be read out from the DRAM 1222 and may be used in a correlation operation with a reference signal in the correlation operation unit 1223. The band search controller 1221 obtains a correlation result between the IQ data (received) and the reference signal in the correlation operation section.

Referring back to FIG. 13, then, the band search unit 122 determines whether all search carrier frequencies have been searched (S15). For example, the band search controller 1221 has information on the upper limit of all search carrier frequencies in, for example, the internal memory, and first, sets the lowest frequency (S12), and then determines whether a frequency has reached the upper limit by gradually increasing the frequency.

When not all search carrier frequencies have been searched (No in S15), the process proceeds to S11 and the processes from S11 to S15 are repeated. For example, the RF unit 121 performs a reception process by switching the carrier frequency to a next frequency, and obtains a radio signal corresponding to the frequency. Then, in the band search unit 122, a correlation result corresponding to the frequency is obtained (S14). In this manner, in the band search unit 122, the frequency is successively switched to obtain a correlation result at each frequency.

When all search carrier frequencies have been searched (Yes in S 15), in the band search unit 122, the carrier frequency is detected (S16). For example, the band search controller 1221 detects the frequency having the highest correlation result among the plurality of detected correlation results as for the carrier frequency.

Then, a series of band search processes are finished (S17).

FIG. 14 is a flowchart illustrating an operation example of the initial cell search process. The initial cell search unit 123 detects the P-SCH (S21) when the process is initiated (S20).

As described above, in the correlation operation unit 1233, a correlation result between the reference signal (a conventionally known signal sequence corresponding to a first synchronizing signal) and IQ data (received) is calculated. Then, in the initial cell search controller 1231, for example, a symbol timing or a P-SCH number is detected according to the correlation result.

Then, the initial cell search unit 123 detects an S-SCH (S22). As described above, a correlation result between the reference signal (a conventionally known signal sequence corresponding to a second synchronizing signal) and IQ data (received) is calculated in the correlation operation unit 1233. Then, in the initial cell search controller 1231, for example, a frame timing, a scrambling code, and a cell ID group are detected according to the correlation result.

Then, the initial cell search unit 123 performs a confirmation (or verifying) (S23). For example, the initial cell search controller 1231 verifies whether each detected timing or each detected cell ID group is within a predetermined range (S23).

The initial cell search unit 123 finishes the initial cell search process (S24) when determining that the detected result is within the predetermined range (Yes in S23). Meanwhile, when determining that the detected result is out of the predetermined range (No in S23), the initial cell search unit 123 repeats the processings from the detection of the P-SCH (S21 to S23).

PRESENT OPERATION EXAMPLE

Hereinafter, an operation example of the wireless device 100 will be described.

As described above, in the wireless device 100 of the present disclosure, for example, a cell search process is devided into plural processes, and the devided processes are separately performed using other DSPs that are unused during the cell search process together with the DSP of the band search unit 122 or the initial cell search unit 123. As for other DSPs, for example, the DSP 127 of the demodulating unit 125 and the DSP 128 of the decoding unit 126 may be used.

When the cell search process is performed, the band search process or the initial cell search process is performed in the band search unit 122 or the initial cell search unit 123, but the original processing (e.g., a demodulation process or a decoding process) is not performed in the demodulating unit 125 or the decoding unit 126. Accordingly, the cell search process may be performed using the DSP 127 or 128 of the demodulating unit 125 or the decoding unit 126. In the case, as for other DSPs, the DSPs 157 and 158 of the baseband transmitting unit 150 may be used.

In the operation example to be described later, as for other DSPs during the cell search process, for example, two DSPs 127 and 128 are used. In the description, it is assumed that the band search unit 122 or the initial cell search unit 123 is constituted by the DSP (hereinafter, may be referred to as DSP 122 or 123).

In the present operation example, the cell search process is performed using the plurality of DSPs 122, 123, 127, and 128. Specifically, there are four operation examples as described below.

Operation Example 1

In operation example 1, when a section of a correlation operation for IQ data is divided by the number of a plurality of available DSPs, a correlation operation is performed by each of the DSPs on IQ data of each divided section.

Figure 15A:
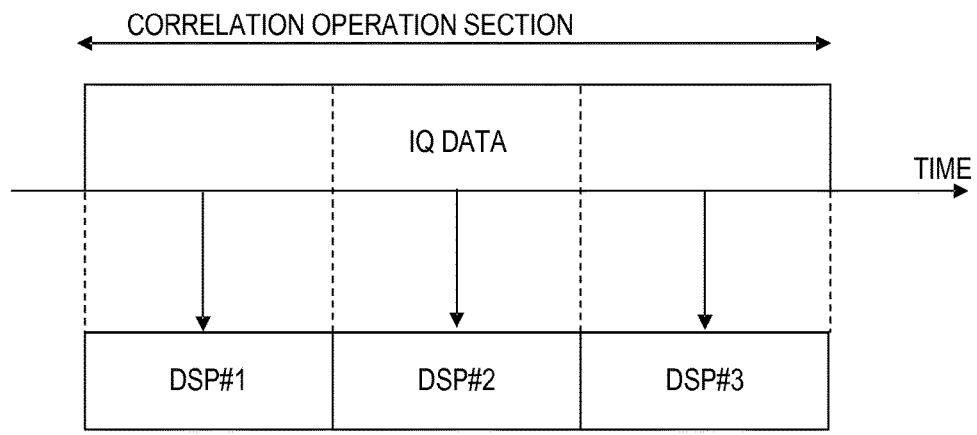
FIGS. 15A and 15B are diagrams illustrating an example of an operation, according to an embodiment.
Figure 15B:
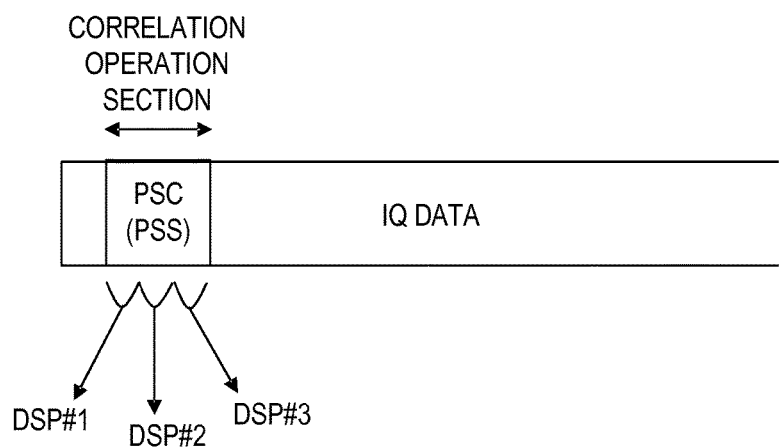

FIGS. 15A and 15B are views for explaining operation example 1. In the example of FIG. 15A, as for the plurality of available DSPs, three DSPs #1 to #3 are exemplified.

In a 3G system, the first synchronizing signal PSC is transmitted from the base station 200 at an interval of 666.6 μs. In this case, when the cell search process is performed, a correlation operation for the first synchronizing signal PSC is performed on IQ data (received) in a section of, for example, 666.6 μs. Accordingly, in operation example 1, the correlation operation section (e.g., 666.6 μs) for the first synchronizing signal PSC is divided by the number of DSPs #1 to #3, and the correlation operation is performed on IQ data in each divided section by each of DSPs #1 to #3.

In an LTE system, the first synchronizing signal PSS is transmitted from the base station 200 at an interval of 5 ms. Accordingly, in the LTE system, a correlation operation section of 5 ms is divided by the number of three DSPs #1 to #3, and the correlation operation is performed on IQ data (received) in each divided section by each of DSPs #1 to #3.

The correlation operation for the first synchronizing signal PSC or PSS is performed during the band search process (e.g., in S14 of FIG. 13) or the initial cell search process (e.g., in S21 of FIG. 14). Accordingly, when the band search process is performed, for example, three DSPs 122, 127, and 128 may be used. Also, when the initial cell search process is performed, for example, three DSPs 123, 127, and 128 may be used.

As illustrated in FIG. 15A, DSPs #1 to #3 process IQ data (received) in respective divided sections. However, the processes of respective DSPs #1 to #3 are performed in a parallel manner (or simultaneously). For example, the following processing is performed.

That is, IQ data (received) are simultaneously recorded in each of the DRAMs 1222 (or 1232) and 1272 of the DSPs 122 (or 123), 127, and 128. In this case, the controller 140 outputs a signal indicating which one of the divided sections is to be subjected to the correlation operation, to each of the DSPs 122 (or 123), 127, and 128. The controllers 1221 (or 1231) and 1273 of the DSPs 122 (or 123), 127, and 128 read out IQ data in the section indicated by the controller 140, among the IQ data (received) recorded in the DRAM 1222 (or 1232) and 1272 so that the correlation operation is performed on the corresponding IQ data.

Accordingly, in the DSP 122 (or 123), the correlation operation is performed on the IQ data of a first section among the IQ data in the three divided sections. Also, in the DSP 127, the correlation operation is performed on the IQ data of an intermediate section among the IQ data in the three divided sections. Also, in the DSP 128, the correlation operation is performed on the IQ data of a final section among the IQ data in the three divided sections. The respective DSPs 122 and 123 perform the correlation operations in a parallel manner.

As described above, in operation example 1, the correlation operation for the first synchronizing signal PSC or PSS is performed not only by the band search unit 122 or the initial cell search unit 123, but also by the plurality of DSPs separately in a parallel manner.

Accordingly, as compared to a case where the correlation operation for the first synchronizing signal PSC or PSS is performed only by the band search unit 122 or the initial cell search unit 123, since the correlation operation is performed by the plurality of DSPs, the result of the correlation operation may be quickly obtained in the present processing. For example, when the number of plurality of DSPs for performing the correlation operation is 4, the result of the correlation operation may be obtained at ¼ as compared to a case where the correlation operation is successively performed by one DSP.

Accordingly, the wireless device 100 may quickly obtain the correlation operation result as compared to a case where the correlation operation is successively performed by one DSP. Thus, a time from the initiation of the band search process until the termination of the initial cell search process may become shorter than a predetermined time. As a result, a time from issuance of a service request until a service is provided may be shorter than a predetermined time.

Operation Example 2

Hereinafter, operation example 2 will be described. In operation example 2, in a case of specifying a scrambling code, the types (or the number of types) of scrambling codes are divided by the number of a plurality of available DSPs, and the divided scrambling codes are specified by the plurality of DSPs, respectively.

Figure 16A:
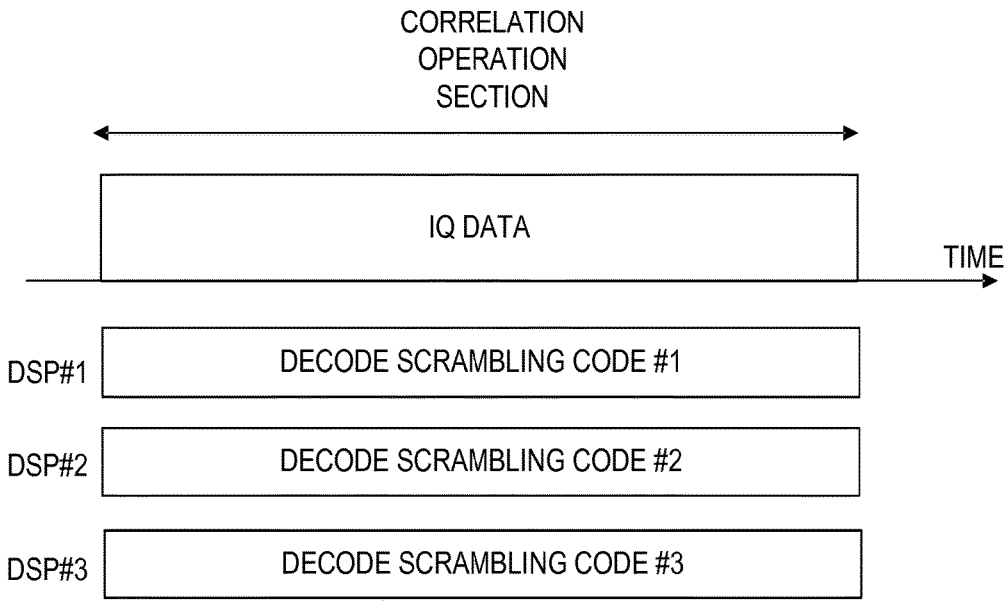
FIGS. 16A and 16B are diagrams illustrating an example of an operation, according to an embodiment.
Figure 16B:
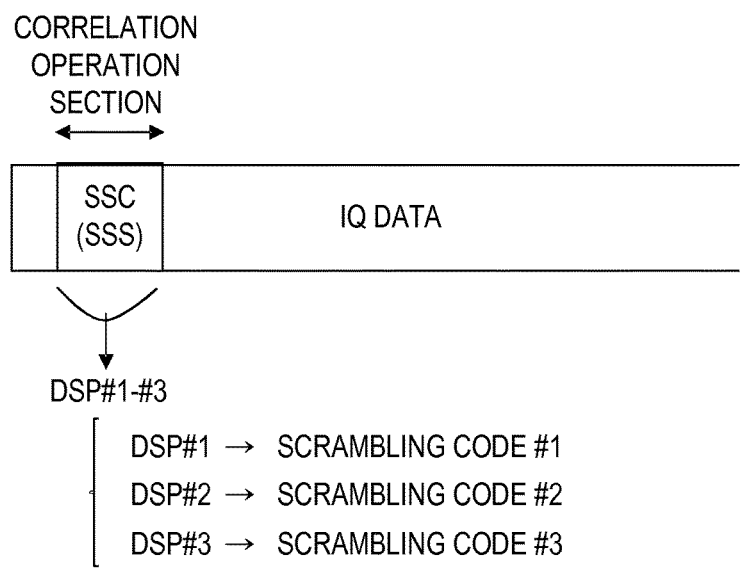

FIGS. 16A and 16B are views for explaining operation example 2. In the example of FIG. 16A, as for the plurality of available DSPs, three DSPs #1 to #3 are exemplified. The number of types of the scrambling codes is 512 in a 3G system, and 8 in an LTE system. For example, any one of a plurality of types of scrambling codes is scrambled with respect to a second synchronizing signal, and the scrambled second synchronizing signal SSC or SSS is transmitted to the wireless device 100. The present operation example 2 is processing performed when the scrambling code is specified using, for example, a conventionally known signal sequence.

Specifying of the scrambling code in the present operation example is performed when, for example, the second synchronizing signal SSC or SSS is detected in the initial cell search process (e.g., S22 in FIG. 14). For example, there are DSPs 123, 127, and 128 as for three types of DSPs #1 to #3.

In the example of FIG. 16A, in the 3G system, processes of specifying scrambling codes #1 to #170, scrambling codes #171 to #340, and scrambling codes #341 to #512 may be performed by DSP #1, DSP #2, and DSP #3, respectively. In the LTE system, processes of specifying scrambling codes #1 to #3, scrambling codes #4 to #6, and scrambling codes #7 and #8 may be performed by DSP #1, DSP #2, and DSP #3, respectively.

The division of types of the scrambling codes may be performed by any method. In the initial cell search unit 123, the types (or the number) of scrambling codes to be specified may be larger or smaller than other DSPs.

Which scrambling codes are to be specified by each of DSPs #1 to #3 may be indicated by an instruction signal from the controller 140 (e.g., an instruction signal indicating scrambling codes #1 to # 512). The respective DSPs #1 to #3 perform the processes in a parallel manner as in operation example 1.

For example, the following processing is performed. That is, the controller 140 outputs a corresponding instruction signal to each of the DSPs 123, 127, and 128. The corresponding instruction signal includes information on which scrambling codes are specified by each of the DSPs 123, 127 and 128. The initial cell search controller 1231 of the DSP 123 outputs a conventionally known reference signal corresponding to the instruction signal to the correlation operation unit 1233. The DSP controller 1273 of the DSP 127 and 128 performs the correlation operation by using a conventionally known reference signal corresponding to the instruction signal.

Accordingly, for example, the DSP 123 allows a process of specifying the scrambling codes #1 to #170 to be performed by the correlation operation unit 1233. Also, the DSP 127 allows a process of specifying the scrambling codes #171 to #340 to be performed by the DSP controller 1273. Also, the DSP 128 allows a process of specifying the scrambling codes #341 to #512 to be performed by the DSP controller 1273. The respective DSPs 123, 127, and 128 perform these processes in a parallel manner.

As described above, in operation example 2, the plurality of DSPs 123, 127, and 128 may perform correlation operations for specifying respective divided scrambling codes among the plurality of types of scrambling codes, respectively, in a parallel manner.

Accordingly, as compared to a case where all types of scrambling codes are specified only by the initial cell search unit 123, the scrambling codes may be quickly specified since each part of the scramble codes is specified by each of the DSPs 123, 127 and 128.

Accordingly, in the wireless device 100 of the present disclosure, a time from the initiation of the band search process until the termination of the initial cell search process may become shorter than a predetermined time. As a result, a time from issuance of a service request until a service is provided may be shorter than a predetermined time.

Operation Example 3

In operation example 3, a band (or a frequency band) or a bandwidth (or a frequency bandwidth), as a band search processing target, is divided by a plurality of available DSPs, and a band search process is performed on each divided band by each of the plurality of DSPs. The band for the band search processing target is, for example, a system frequency band used for transmitting or receiving a radio signal.

Figure 17A:
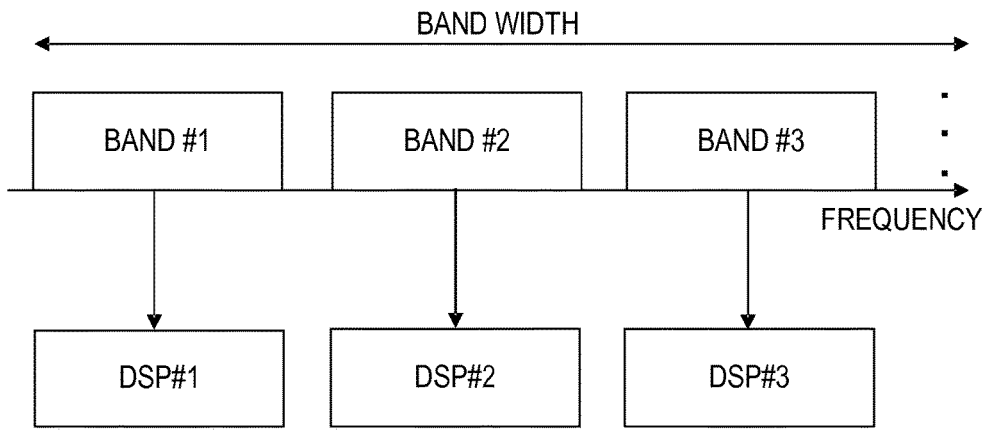
FIGS. 17A to 17D are diagrams illustrating an example of an operation, according to an embodiment.
Figure 17B:
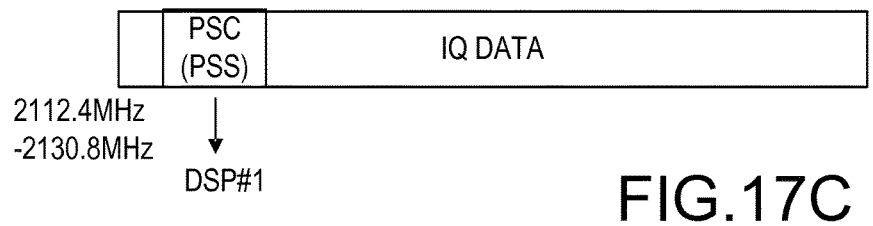
Figure 17C:
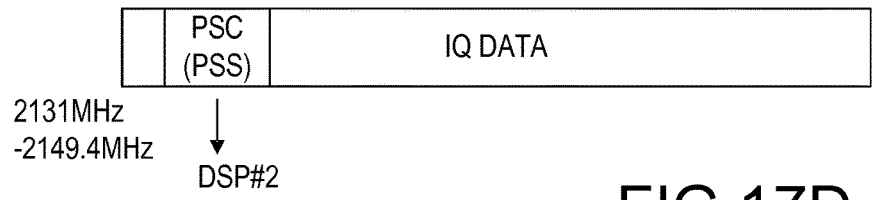
Figure 17D:
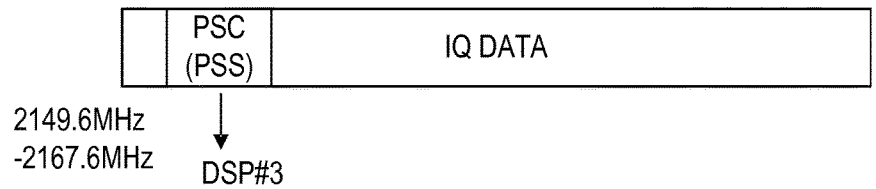

FIGS. 17A to 17D are views for explaining operation example 3. In the example of FIG. 17A, as for the plurality of available DSPs, three DSPs #1 to #3 are exemplified. The band search process is performed in, for example, the band search unit 122. Thus, there are DSPs 122, 127, and 128 as for DSPs #1 to #3.

In a 3G system, in one band (e.g., Operating Band 1), an band search may be performed 276 times. In the example of FIG. 17A, the bandwidth is divided into three bandwidths. For example, DSP#1 performs a band search process on a band of 2112.4 MHz to 2130.8 MHz. DSP# 2 performs a band search process on a band of 2131 MHz to 2149.4 MHz. DSP# 3 performs a band search process on a band of 2149.6 MHz to 2167.6 MHz. As a result, the number of performing the band search process in each of DSPs #1 to #3 is 92 (=(2130.8-2112.4)/0.2).

In an LTE system, in one band (e.g., Operating Band 1), a band search may be performed 600 times. Since the bandwidth is divided into three bandwidths each being subjected to the processing, for example, DSP#1 performs a band search on a band of 2110 MHz to 2130 MHz, DSP# 2 performs a band search on a band of 2130 to 2150 MHz, and DSP# 3 performs a band search on a band of 2150 MHz to 2170 MHz. As a result, the number of performing the band search process in each of DSPs #1 to #3 is 200 (=20/0.1).

In this manner, a bandwidth for a band search processing target is divided by a plurality of available DSPs, and a band search process is performed in each of the DSPs, so that the number of band search processes may be reduced as compared to a case where the processes are performed only by the band search unit 122.

The selection of bands to be subjected to a band search process by each of DSPs #1 to #3 is dependent on an instruction signal from the controller 140. The respective DSPs #1 to #3 perform the processes in a parallel manner as in operation example 1.

For example, the following processing is performed. That is, the controller 140 outputs a corresponding instruction signal to each of the DSPs 122, 127, and 128. The instruction signal includes information which instructs the DSP 122 to process a band of 2112.4 MHz to 2130.8 MHz. The instruction signal includes information which instructs the DSP 127 to process a band of 2131 MHz to 2149. 4 MHz. The instruction signal includes information which instructs the DSP 128 to process a band of 2149.6 MHz to 2167.6 MHz. The controllers 1221 and 1273 of the DSPs 122, 127, and 128 read out IQ data (received) of the band indicated according to the corresponding instruction signal from the DRAMs 1222 and 1272 so that the correlation operation is performed. The respective DSPs 122, 127, and 128 perform the band search processes in a parallel manner.

As described above, in operation example 3, since the band search processes are performed by the plurality of DSPs 122, 127, and 128, the number of performing a band search process in each of the DSPs 122, 127, and 128 is smaller than a predetermined number. Also, since the band search processes are performed by the respective DSPs 122, 127, and 128, in a parallel manner, a time taken for the band search processes is shorter than a predetermined time.

Accordingly, in operation example 3, a processing time of a band search process becomes shorter than a predetermined time, and a time from the initiation of the band search process until the termination of the initial cell search process may become shorter than a predetermined time. As a result, a time from issuance of a service request until a service is provided may be shorter than a predetermined time.

Operation Example 4

In operation example 4, when a carrier aggregation is performed, a plurality of carriers (or a plurality of frequency bands) are divided by a plurality of available DSPs, respectively (or a collective frequency band is divided by a plurality of DSPs) so that a band search process and an initial cell search process are performed.

FIGS. 18A to 18D are views for explaining operation example 4. In the example illustrated in FIG. 18A, three types of component carriers #1 to #3 are allocated to three types of DSPs #1 to #3, respectively.

The carrier aggregation is a communication using, for example, a plurality of component carriers (or a plurality of frequency bands). To each component carrier, a frequency band of a predetermined bandwidth (e.g., 20 MHz) is allocated. Each component carrier is allocated to a continuous or discontinuous frequency band. For example, each of a downlink communication and an uplink communication is allocated a maximum of 5 component carriers.

In the example of FIGS. 18B to 18D, the followings are performed. That is, as for carrier #1, a component carrier with a frequency band of 800 MHz is allocated, and carrier #1 is allocated to DSP #1. As for carrier #2, a component carrier with a frequency band of 1.5 GHz is allocated, and carrier #2 is allocated to DSP #2. As for carrier #3, a component carrier with a frequency band of 2.0 GHz is allocated, and carrier #3 is allocated to DSP #3.

The selection of carriers #1 to #3 to be allocated to each of DSPs #1 to #3 is dependent on, for example, an instruction signal from the controller 140. Also, respective DSPs #1 to #3 perform the processes in a parallel manner as in operation example 1.

For example, the following processing is performed. That is, the controller 140 outputs a corresponding instruction signal to each of the DSPs 122 (or 123), 127, and 128. The corresponding instruction signal includes, for example, an identification number of a component carrier, and information of a band and a bandwidth thereof. The controllers 1221 (or 1231) and 1273 of the DSPs 122 (or 123), 127, and 128 read out IQ data (received) of the carrier indicated according to the instruction signal from the DRAMs 1222 (or 1232) and 1272 so that the correlation operation is performed.

Accordingly, for example, cell search processes are performed on carrier #1, carrier #2, and carrier #3 by the DSP 122 (or 123), the DSP 127, and the DSP 128, respectively. In this case, the respective DSPs 122 (or 123), 127, and 128 perform the cell search processes in a parallel manner.

In this manner, in operation example 4, the respective component carriers are divided by the plurality of DSPs 122 (or 123), 127, and 128 so that the cell search processes are performed in a parallel manner. Accordingly, as compared to the case where a band search process or an initial cell search process is performed on all component carriers by the band search unit 122 or the initial cell search unit 123, the cell search result may be quickly obtained since the cell search process is performed by the plurality of DSPs.

Accordingly, in the wireless device 100 of the present disclosure, a processing time for the cell search process becomes shorter than a predetermined time, and a time from the initiation of the band search process until the termination of the initial cell search process may become shorter than a predetermined time. As a result, in the wireless device 100 of the present disclosure, a time from issuance of a service request until a service is provided may be reduced.

Overall Operation Example

Figure 19:
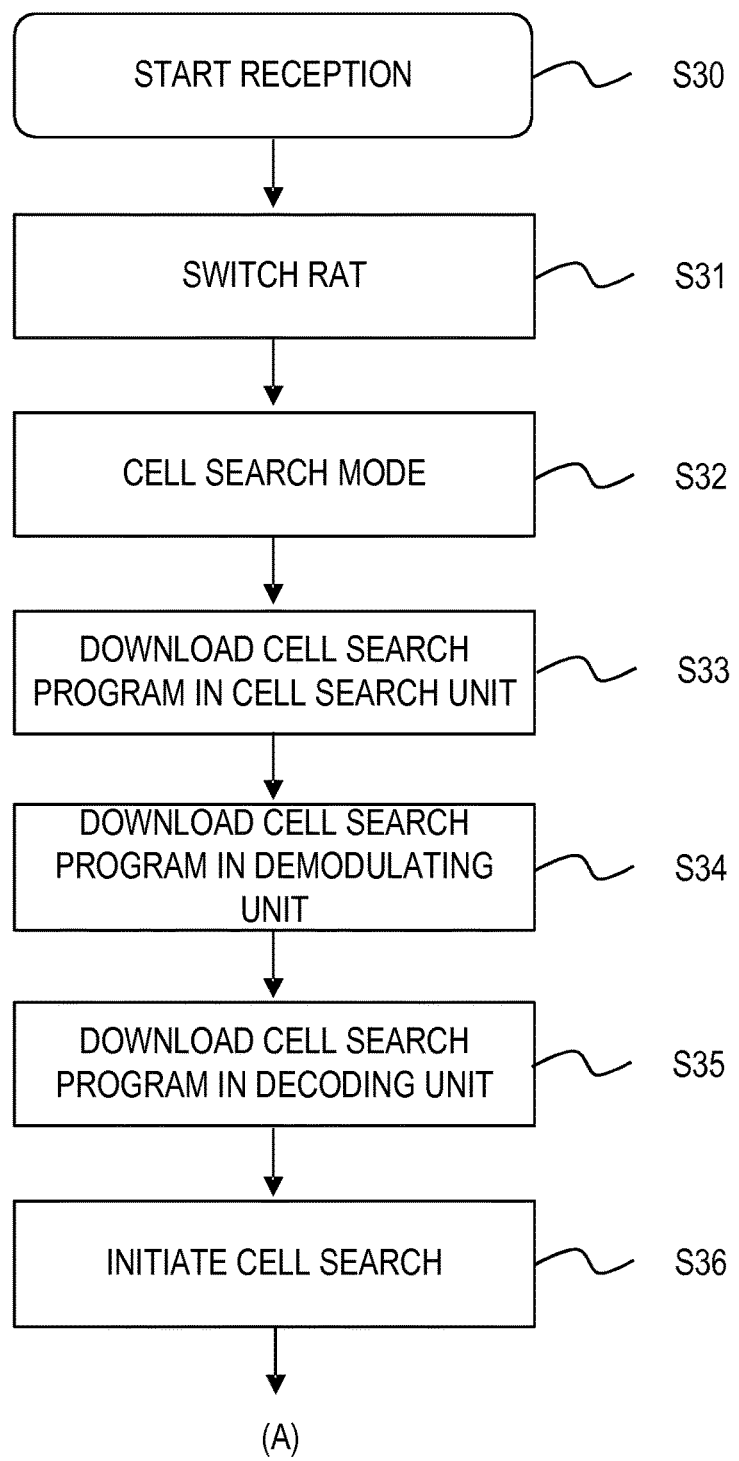
FIG. 19 is a diagram illustrating an example of an operational flowchart for an overall operation, according to an embodiment.
Figure 20:
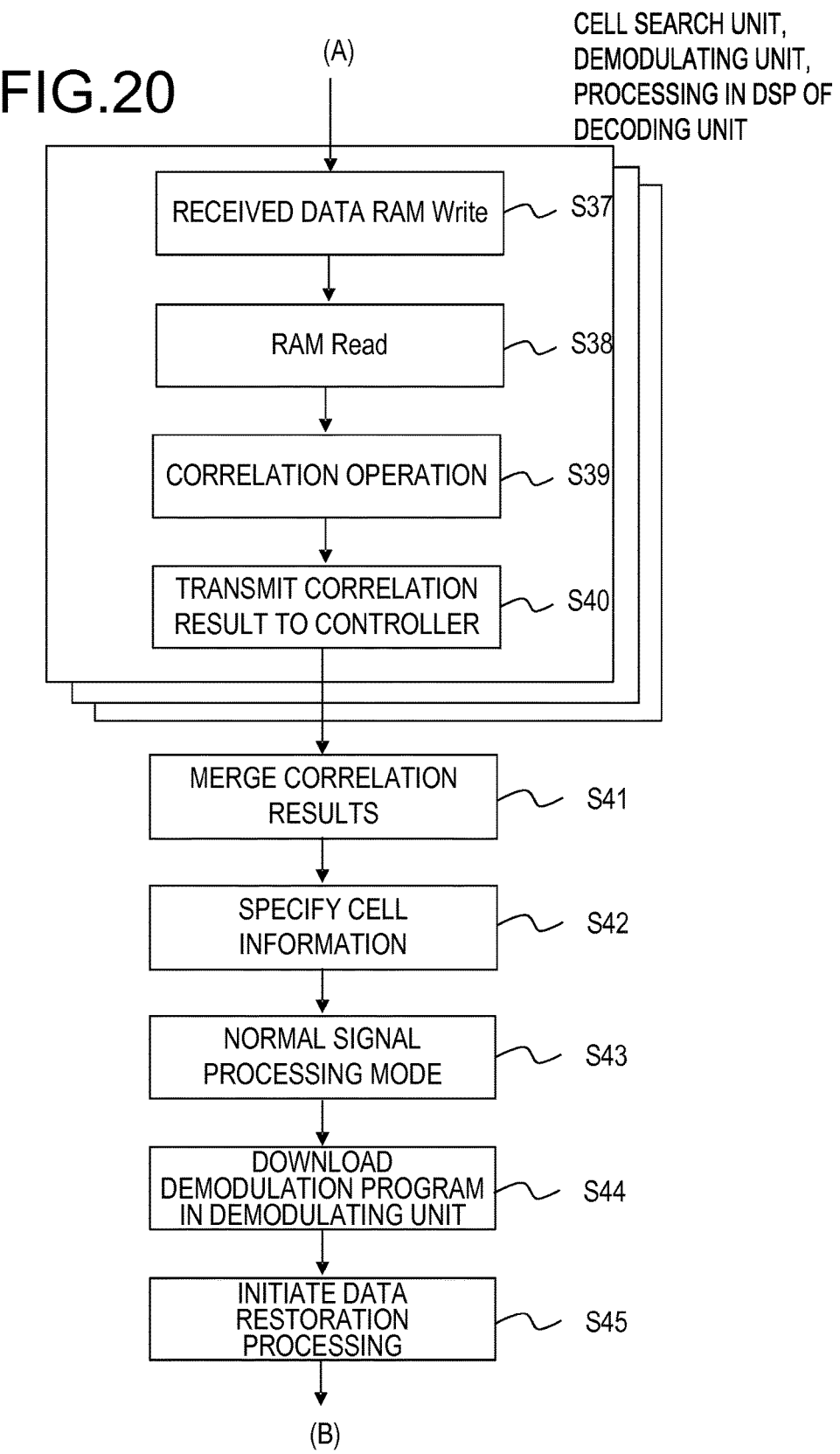
FIG. 20 is a diagram illustrating an example of an operational flowchart for an overall operation, according to an embodiment.
Figure 21:
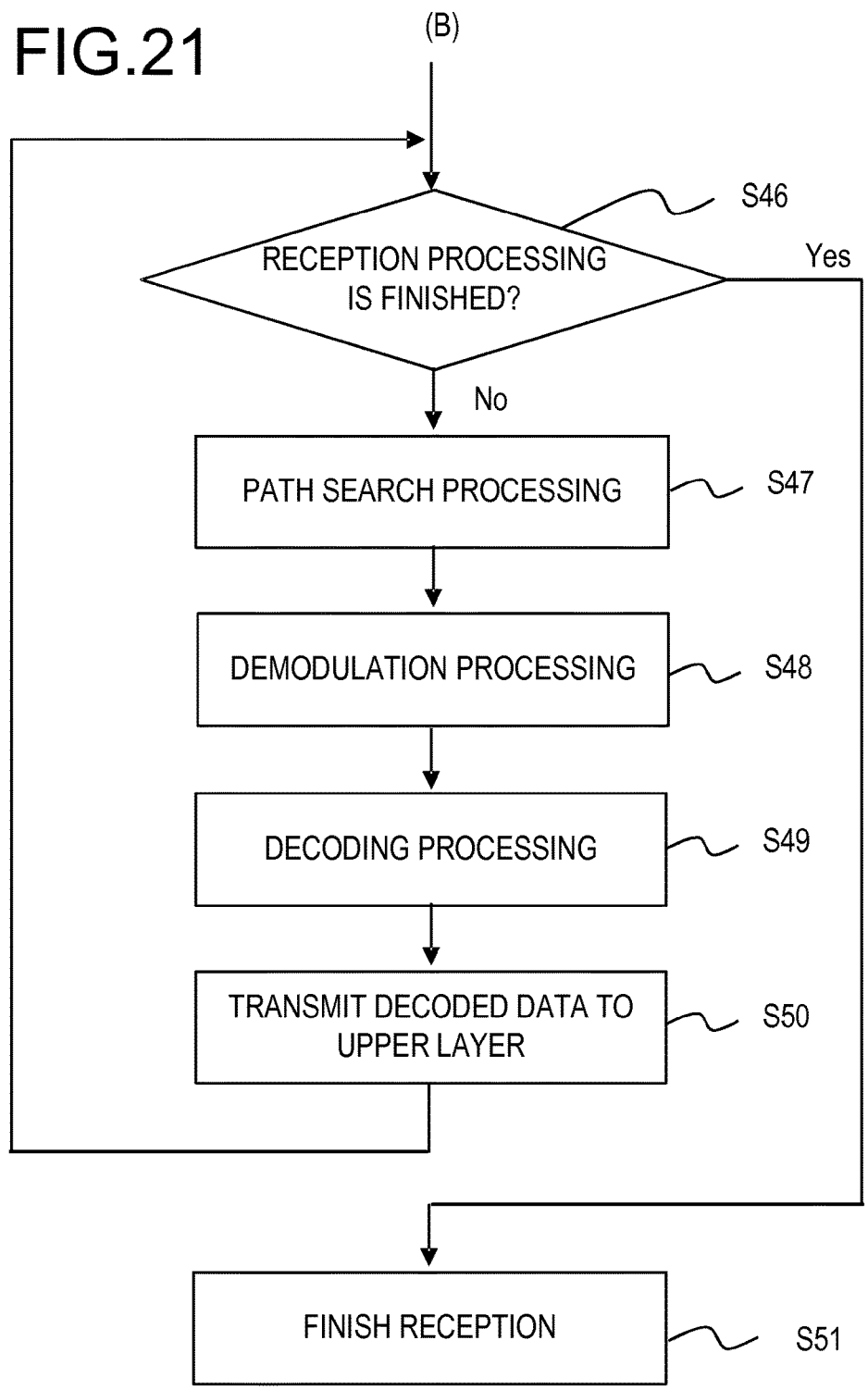
FIG. 21 is a diagram illustrating an example of an operational flowchart for an overall operation, according to an embodiment.
Figure 22:
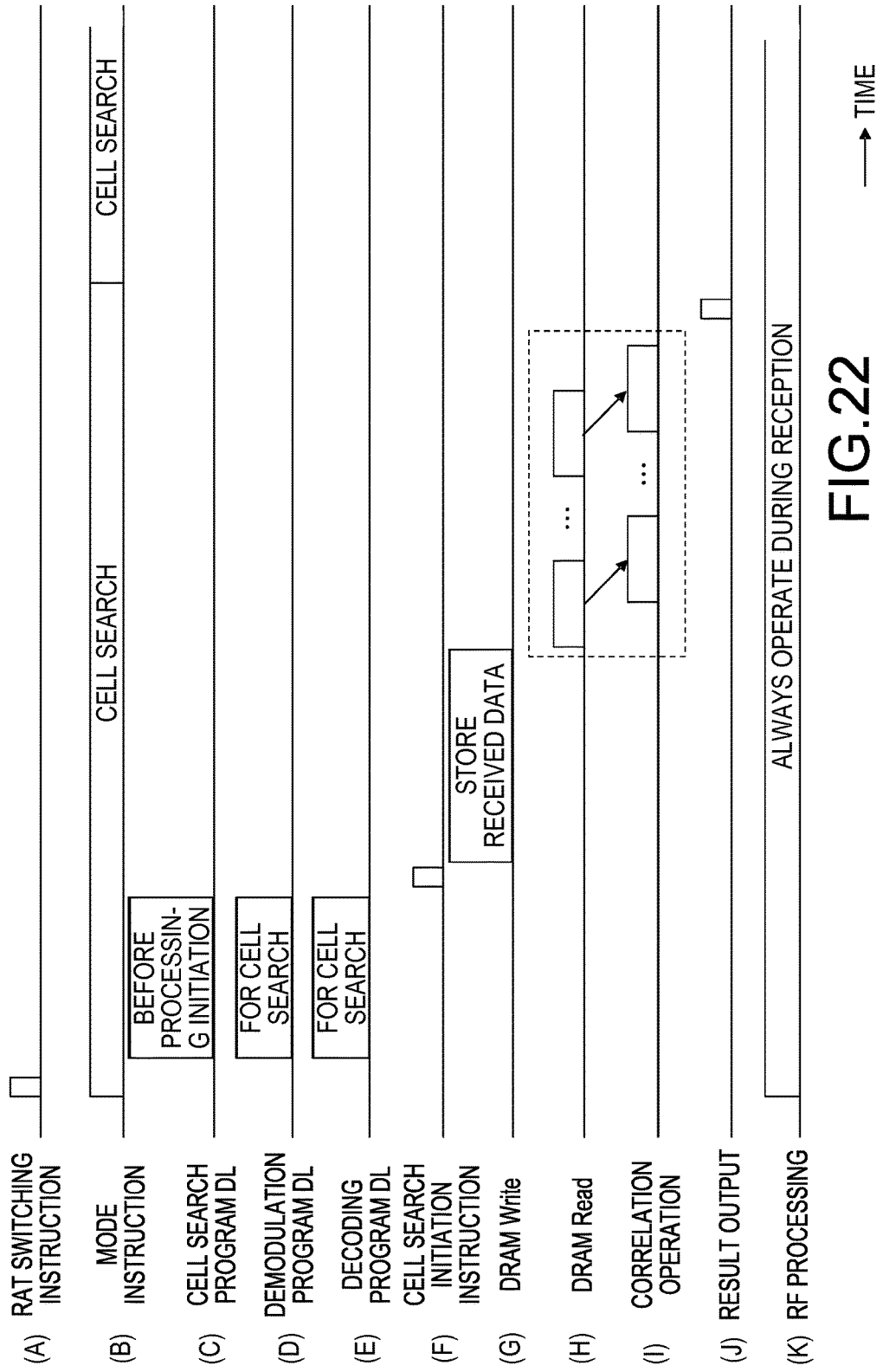
FIG. 22 is a diagram illustrating an example of a sequence for an overall operation, according to an embodiment.
Figure 23:
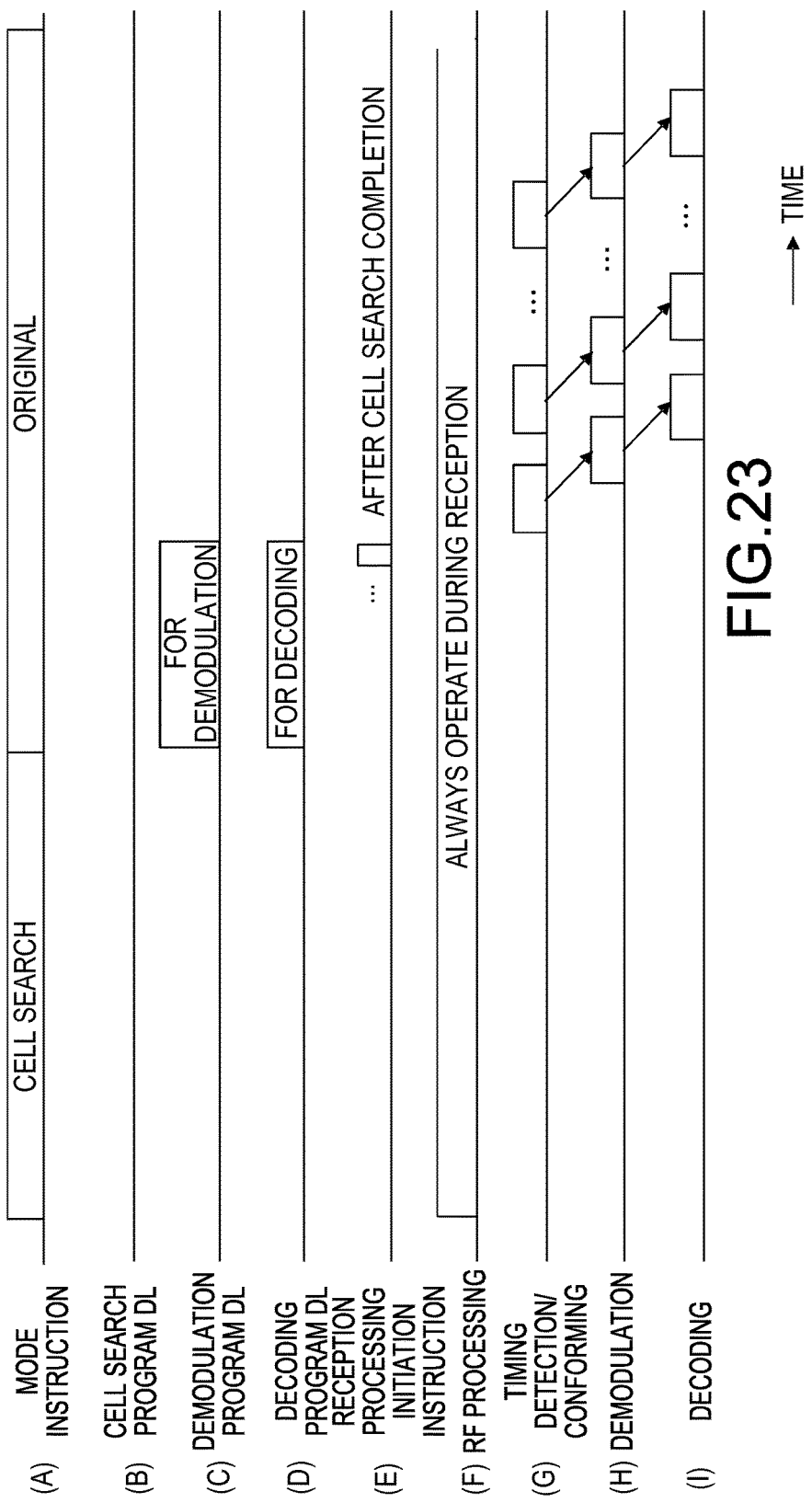
FIG. 23 is a diagram illustrating an example of a sequence for an overall operation, according to an embodiment.
Figure 24:
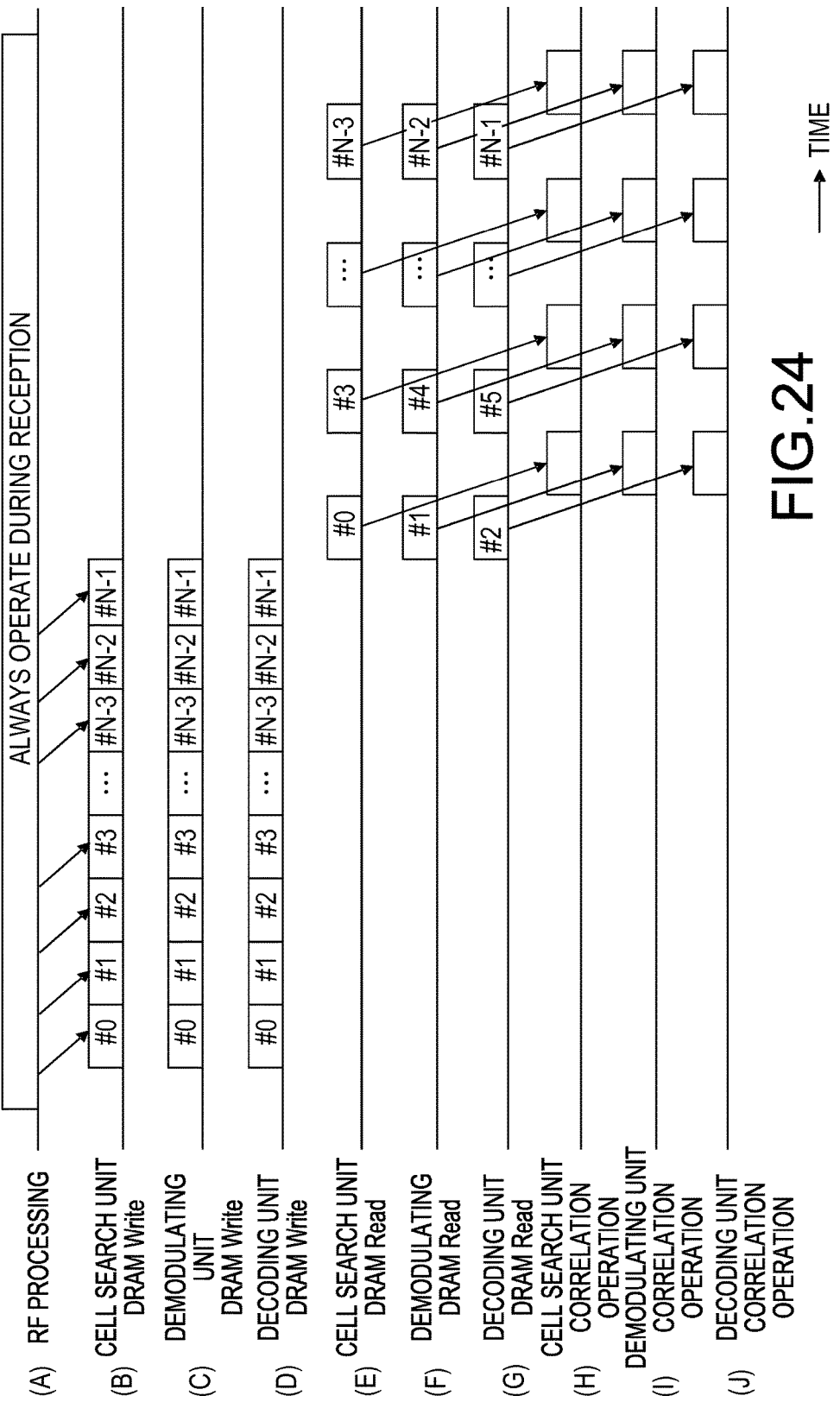
FIG. 24 is a diagram illustrating an example of a sequence for an overall operation, according to an embodiment.

Hereinafter, the overall operation example will be described. FIGS. 19 to 21 illustrate flowcharts illustrating an overall operation example, and FIGS. 22 to 24 are sequence diagrams illustrating the overall operation example.

The overall operation example will be described using the flowcharts. The sequence diagrams will be properly used in the descriptions.

The wireless device 100 starts to receive a radio signal (S30), and switches a communication scheme (RAT) (S31) to shift to a cell search mode (S32). For example, the controller 140 generates a switching instruction signal of a communication scheme and outputs the signal to the baseband receiving unit 120 and the baseband transmitting unit 150. The controller 140 outputs a mode signal indicating shift to the cell search mode to the baseband receiving unit 120 and the baseband transmitting unit 150.

Then, the wireless device 100 downloads a cell search program in a cell search unit (S33). For example, the controller 140 reads out a band search program and an initial cell search program from the SRAM 141 to download the programs to the band search unit 122 and the initial cell search unit 123, respectively.

Then, the wireless device 100 downloads the cell search program in the demodulating unit 125 (S34). For example, the controller 140 reads out the band search program or the initial cell search program from the SRAM 141 to download the program to the demodulating unit 125.

Then, the wireless device 100 downloads the cell search program in the decoding unit 126 (S35). For example, the controller 140 reads out the band search program or the initial cell search program from the SRAM 141 to download the program to the decoding unit 126.

The processing sequence from S33 to S35 may be different from that illustrated in FIG. 19.

Then, the wireless device 100 initiates the cell search process (S36). For example, the controller 140 generates a cell search start signal and transmits the generated cell search start signal to the band search unit 122 or the initial cell search unit 123, the demodulating unit 125, and the decoding unit 126. (A) to (F) of FIG. 22 illustrate an exemplary sequence from RAT switching instruction to cell search processing initiating instruction.

Referring back to FIG. 20, then, the wireless device 100 performs processes from S37 to S40 in respective available DSPs. That is, the DSPs 122, 123, 127, and 128 record IQ data (received) in the DRAMs 1222, 1232 and 1272 (S37). Then, the DSPs 122, 123, 127, and 128 read out IQ data (received) from the DRAMs 1222, 1232 and 1272 (S38) so that a correlation operation is performed on IQ data (received) with respective to a reference signal (S39). Then, the DSPs 122, 123, 127, and 128 acquire correlation results, and output the acquired correlation results to the controller 140 (S40).

In this case, as described in operation example 1 to operation example 4, the controller 140 outputs an instruction signal indicating each of divided sections for IQ data (operation example 1), or each of types of divided scrambling codes (operation example 2), to each of the DSPs 122, 123, 127, and 128. The controller 140 outputs an instruction signal indicating each of divided bandwidths (operation example 3) or each of allocated component carriers (operation example 4), to each of the DSPs 122, 123, 127, and 128.

(A) to (J) of FIG. 24 illustrate a detailed example of an exemplary sequence from (H) to (I) of FIG. 23. The example of (A) to (J) of FIG. 24 illustrates operation example 1. In this example, the correlation operation is performed on IQ data in a divided section by the DSP of a cell search unit (the band search unit 122 or the initial cell search unit 123), and DSPs 127 and 128 of the demodulating unit 125 and the decoding unit 126, respectively.

Referring back to FIG. 20, then, the wireless device 100 merges the correlation results (S41), and specifies band information and cell information based on the merged result (S42). For example, the controller 140 outputs the merged result to the band search unit 122 or the initial cell search unit 123 so that band information is specified by the band search unit 122, and cell information is specified by the initial cell search unit 123.

(G) to (J) of FIG. 22 illustrate an exemplary sequence from recording in the DRAMs 1222, 1232, and 1272 until the cell information is specified.

Referring back to FIG. 20, then, the wireless device 100 shifts to a normal reception processing mode (S43). For example, the controller 140 outputs a mode signal indicating shift to a normal reception processing mode, to the baseband receiving unit 120 and the baseband transmitting unit 150.

Then, the wireless device 100 downloads a demodulation program to the demodulating unit 125, and a decoding program to the decoding unit 126 (S44). For example, the controller 140 reads out the demodulation program and the decoding program from the SRAM 141 and downloads the programs in the DSPs 127 and 128 of the demodulating units 125 and the decoding unit 126, respectively.

Then, the wireless device 100 initiates a data restoration process on IQ data (received) (S45). For example, in the demodulating unit 125, a demodulation process is performed on the IQ data (path-conformed), and in the decoding unit 126, a data decoding process is performed on the likelihood data.

Then, the wireless device 100 determines whether the reception process is finished or not (S46 of FIG. 21). For example, when detecting that a radio signal is not input to the RF unit 121 for a certain period of time, the controller 140 determines that the reception process is finished, whereas when detecting a radio signal, the controller 140 determines that the reception process is not finished.

When determining that the reception process is finished (Yes in S 46), the wireless device 100 finishes a series of processes (S51). Meanwhile, when determining that the reception process is not finished (No in S46), the wireless device 100 performs a path search process (S47).

Then, the wireless device 100 performs a demodulation process (S48) and a decoding process (S49) on IQ data (path-conformed) through the path search process.

Then, the wireless device 100 outputs decoded data to an upper layer, for example, the application processor 105 (S50).

(B) to (I) of FIG. 23 illustrate an exemplary sequence from downloading of the demodulation program and the decoding program until demodulation and decoding are performed.

As described above, in the second exemplary embodiment of the present disclosure, when the cell search process is performed, cell search processes are performed using unused resources (or referred to as idle resources) in a parallel manner. Accordingly, as compared to a case where the cell search process is executed only by the band search unit 122 or the initial cell search unit 123, a time from initiation of the band search process to the termination of the initial cell search process may be reduced. As a result, for example, a time from issuance of a service request until a service is provided may become relatively short.

Also, in the second exemplary embodiment of the present disclosure, the above described prcoessings are performed without adding a new circuit to the wireless device 100.

Accordingly, in the wireless device 100 of the present disclosure, a time until a service is provided may become shorter than a predetermined time while suppressing an increase of a circuit scale. A time from initiation of a band search process until termination of an initial cell search process may become shorter than a predetermined time while suppressing an increase of a circuit scale.

[Another Exemplary Embodiment]

Hereinafter, another exemplary embodiment will be described.

Figure 25:
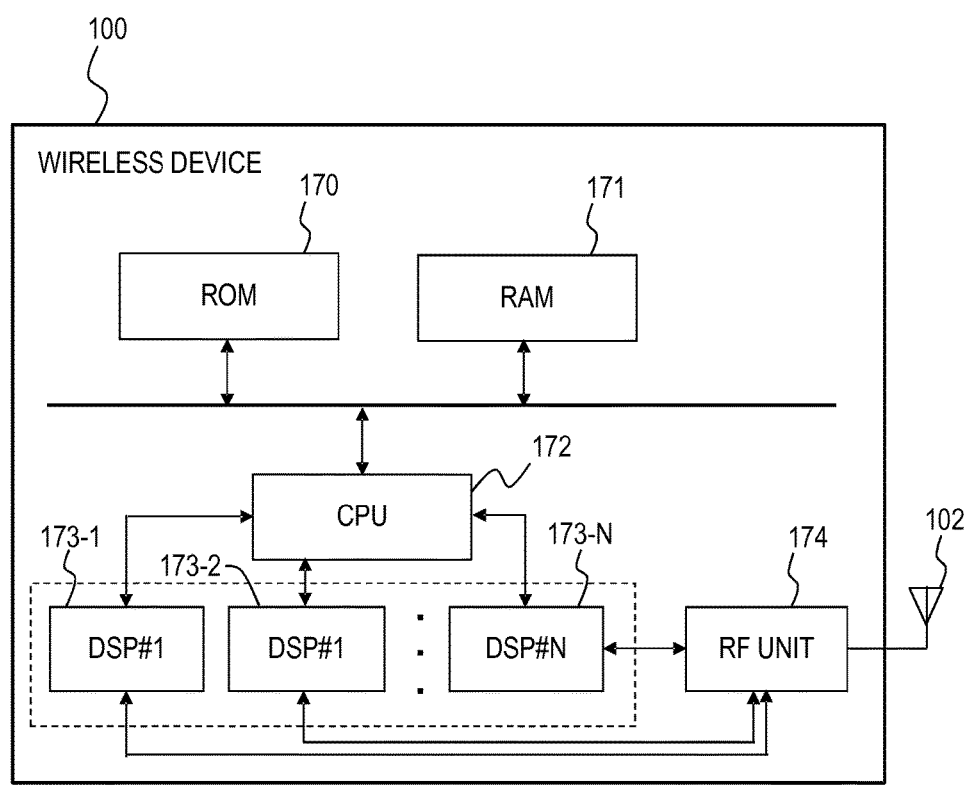
FIG. 25 is a diagram illustrating an example of a configuration of a wireless device, according to an embodiment.

FIG. 25 illustrates a hardware exemplary configuration of the wireless device 100. The wireless device 100 includes a read only memory (ROM) 170, a RAM 171, a central processing unit (CPU) 172, DSPs 173-1 to 173-N (N is an integer of 2 or more), and an RF unit 174.

The CPU 172 reads out a program stored in the ROM 170 and loads the program in the RAM 171. The CPU 172 then executes the loaded program so that various functions are executed. The CPU 172 corresponds to, for example, the controller 140 in the second exemplary embodiment.

In the RAM 171, for example, a cell search program, a demodulation program, a decoding program, an encoding program, and a modulation program are stored. The CPU 172 properly reads out these programs from the RAM 171 and downloads the programs to the DSPs 173-1 to 173-N.

The RAM 171 corresponds to, for example, the SRAM 141 of the second exemplary embodiment.

The DSPs 173-1 to 173-N perform, for example, a band search process or an initial cell search process, a demodulation process or a decoding process, and an encoding process or a modulation process. Each of the DSPs 173-1 to 173-N may be provided according to each process. The DSPs 173-1 to 174-N correspond to, for example, the band search unit 122, the initial cell search unit 123, the path search unit 124, the demodulating unit 125, the decoding unit 126, the encoding unit 151, and the modulating unit 152 of the second exemplary embodiment The RF unit 174 converts, for example, data output from the DSPs 173-1 to 173-N into a radio signal, and outputs the radio signal to the antenna 102. Also, the RF unit 174 receives a radio signal from the antenna 102, converts the radio signal into data in a baseband, and outputs the data to the DSPs 173-1 to 173-N. The RF unit 174 corresponds to, for example, the RF unit 121 and the RF unit 155 of the second exemplary embodiment.

In the wireless device 100 illustrated in FIG. 25 as well, for example, the processing described in the second exemplary embodiment may be performed.

In the exemplary embodiment as described above, a mobile terminal device has been exemplified as for the wireless device 100. For example, a fixed-type immobile communication terminal device may be used. There is a system configured to transmit measurement values of, for example, gas or electricity to a server apparatus through another fixed-type communication terminal device. Such a fixed-type communication terminal device is fixedly installed at home to transmit data such as a measurement value to another fixed communication terminal device or server apparatus via a wireless communication. Such a fixed communication terminal device may perform the above described processing as well.

In the exemplary embodiment as described above, a DSP for each of the blocks 122, 123, 127, 128, 157, and 158 in the wireless device 100 has been exemplified. For example, each of the blocks 122, 123, 127, 128, 157, and 158 may be a block which includes, for example, a processor, a controller, or a memory, such as a field programmable gate array (FPGA) or a combination of a CPU, a ROM, and a RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A wireless device comprising:
    a memory configured to store a first program for executing a cell search process on data transmitted from another wireless device, and a second program for executing a demodulation process and/or a decoding process after the cell search process;
    a first hardware processor configured to execute the first program;
    a second hardware processor configured to execute the second program; and a third hardware processor configured to:
   load the first program stored in the memory in the first hardware processor,
   when the first hardware processor is requested to perform the cell search process by executing the first program, load the first program in the second hardware processor, and
   execute the cell search process on the data in a parallel manner by causing the first and second hardware processors to execute the first program.

2. The wireless device of claim 1, further comprising:
a fourth hardware processor configured to execute a third program for executing an encoding process and/or a modulation process on transmission data to be transmitted to the another wireless device, wherein
the memory is configured to store the third program, and
the third hardware processor is configured to:
   when the first hardware processor is requested to perform the cell search process by executing the first program, load the first program in the fourth hardware processor, and
   execute the cell search process on the data in a parallel manner by causing the first, second, and fourth hardware processors to execute the first program.

3. The wireless device of claim 1, wherein
when the first hardware processor is requested to perform a correlation operation in the cell search process by executing the first program, the third hardware processor divides a correlation operation section for which the correlation operation is to be performed, into a first correlation operation section and a second correlation operation section, and causes the first and second hardware processors to execute the correlation operation on first data in the first correlation operation section and the correlation operation on second data in the second correlation operation section, respectively, in a parallel manner.

4. The wireless device of claim 3, wherein
the third hardware processor outputs instruction signals indicating the first correlation operation section and an instruction indicating the second correlation operation section, to the first and second hardware processors, respectively; and
based on the instruction signals, the first and second hardware processors execute the correlation operation on the first and second data, respectively, in a parallel manner.

5. The wireless device of claim 1, wherein
when the first hardware processor is requested to perform processing of specifying first and second scrambling codes in the cell search process, the third hardware processor causes the first and second processors to execute the processing of specifying the first and second scrambling codes, respectively, in a parallel manner.

6. The wireless device of claim 5, wherein
the third hardware processor outputs instruction signals indicating the first and second scrambling codes to the first and second hardware processors, respectively; and
based on the instruction signals, the first and second hardware processors execute processing of specifying the first and second scrambling codes, respectively, in a parallel manner.

7. The wireless device of claim 1, wherein
when the first hardware processor is requested to perform processing of specifying a carrier frequency used for the wireless device, the third hardware processor divides a predetermined frequency bandwidth into first and second frequency bandwidths, and causes the first hardware processor and the second hardware processor to execute processing of specifying the carrier frequency in the first frequency bandwidth and the carrier frequency in the second frequency bandwidth, respectively, in a parallel manner.

8. The wireless device of claim 7, wherein
the third hardware processor outputs instruction signals indicating the first and second frequency bandwidths to the first and second hardware processors, respectively; and
based on the instruction signals, the first and second hardware processors execute the processing of specifying the carrier frequencies in the first and second frequency bandwidths, respectively, in a parallel manner.

9. The wireless device of claim 1, wherein
when the first hardware processor is requested to perform the cell search process in first and second frequency bandwidths, the third hardware processor causes the first hardware processor and the second hardware processor to execute the cell search process in the first frequency bandwidth and the second frequency bandwidth, respectively, in a parallel manner.

10. The wireless device of claim 9, wherein
the third hardware processor outputs instruction signals indicating the first and second frequency bandwidths to the first and second hardware processors, respectively; and
based on the instruction signals, the first and second hardware processors execute the cell search process in the first and second frequency bandwidths, respectively, in a parallel manner.

11. The wireless device of claim 1, wherein
the first and second hardware processors output results of the cell search process to the third processor;
the third hardware processor merges the results and outputs the merged result to the first hardware processor; and
the first hardware processor executes the cell search process, based on the merged result.

* * * * *